(12) United States Patent
Khirallah et al.

(10) Patent No.: US 11,909,676 B2
(45) Date of Patent: *Feb. 20, 2024

(54) METHOD FOR COORDINATION OF RESOURCES BETWEEN A NEXT GENERATION RADIO ACCESS NETWORK NODE AND AT LEAST ONE FURTHER RAN NODE

(71) Applicant: NEC Corporation, Tokyo (JP)

(72) Inventors: Chadi Khirallah, Tokyo (JP); Yassin Aden Awad, Tokyo (JP); Sadafuku Hayashi, Tokyo (JP); Tao Guo, Tokyo (JP); Robert Arnott, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/949,284

(22) Filed: Sep. 21, 2022

(65) Prior Publication Data

US 2023/0022252 A1 Jan. 26, 2023

Related U.S. Application Data

(63) Continuation of application No. 17/044,389, filed as application No. PCT/JP2019/014740 on Apr. 3, 2019, now Pat. No. 11,496,257.

(30) Foreign Application Priority Data

Apr. 6, 2018 (GB) .................................. 1805814

(51) Int. Cl.
*H04L 5/00* (2006.01)
*H04W 72/27* (2023.01)

(52) U.S. Cl.
CPC ............ *H04L 5/0032* (2013.01); *H04L 5/001* (2013.01); *H04W 72/27* (2023.01)

(58) Field of Classification Search
CPC ... H04L 5/001; H04L 5/0032; H04W 72/0426
See application file for complete search history.

(56) References Cited

U.S. PATENT DOCUMENTS 11,496,257 B2 * 11/2022 Khirallah .............. H04L 5/0032
2015/0009944 A1 * 1/2015 Li ......................... H04W 72/23
370/329

(Continued)

FOREIGN PATENT DOCUMENTS

| JP | 2016-502334 A | 1/2016 |
| WO | 2017/204551 A1 | 11/2017 |
| WO | 2018/028625 A1 | 2/2018 |

OTHER PUBLICATIONS

Japanese Office Action for JP Application No. 2020-554318 dated Nov. 16, 2021 with English Translation.

(Continued)

*Primary Examiner* — Kevin C. Harper
(74) *Attorney, Agent, or Firm* — Sughrue Mion, PLLC

(57) ABSTRACT

A communication system is disclosed in which an NR radio access network (RAN) node identifies resources, that the NR RAN node is to use for transmissions, for protection from interference from another RAN node. The NR RAN node sends, to the other RAN node, information indicating the identified resources for protection from interference. The information indicating the identified resources comprises a list of parameters, typically including resource bitmaps, based on which the other RAN node is able to determine the resources for protection from interference.

4 Claims, 20 Drawing Sheets

(56) References Cited

U.S. PATENT DOCUMENTS

| | | | |
|---|---|---|---|
| 2015/0237645 A1 | 8/2015 | Andrianov et al. | |
| 2015/0257147 A1 | 9/2015 | Ji et al. | |
| 2015/0349908 A1 | 12/2015 | Centonza et al. | |
| 2018/0026837 A1 | 1/2018 | Wen | H04W 76/10 370/328 |
| 2018/0139657 A1 | 5/2018 | Damnjanovic | H04W 74/0891 |
| 2018/0310183 A1 | 10/2018 | Jeon | H04W 88/12 |
| 2019/0305915 A1* | 10/2019 | Zhu | H04L 5/0035 |
| 2020/0053810 A1 | 2/2020 | Lee | H04W 76/15 |
| 2021/0368500 A1* | 11/2021 | Centonza | H04W 72/541 |

OTHER PUBLICATIONS

NEC, "Further discussion on resource coordination in LTE-NR", 3GPP TSG RAN WG3 #99, R3-180877, Feb. 16, 2018.

ZTE, "Stage 3 CR for LTE-NR Co-existence in EN-DC", 3GPP TSG RAN WG3 #98, R3-174329, Nov. 17, 2017.

ZTE, "Further Discussion and 38.300 TP on Cell Radio Resource Sharing", 3GPP TSG RAN WG3 #99bis, R3-181704, Apr. 5, 2018.

AT & T, "TP on signaling support for LTE-NR Coexistence in Overlapping and Adjacent Spectrum", 3GPP TSG RAN WG3 #98, R3-174688, Nov. 17, 2017.

"NGMN", 5G White Paper, The engine of wireless innovation, Mar. 2015, pp. 1-7.

"3rd Generation Partnership Project; Technical Specification Group Radio Access Network; NR; Physical channels and modulation (Release 15)", 3GPP TS 38.211, V15.0.0, Dec. 2017, pp. 1-73.

"NR Frequency and Time Resource Granularity", NEC, 3GPP TSG-RAN WG3 NR AdHoc 1801, R3-180297, Jan. 22-26, 2018, pp. 1-2, Sophia Antipolis, France.

"LTE-NR resource allocation coordination over X2:CR for TS 36.423", Ericsson, 3GPP TSG-RAN WG3 Meeting #99, R3-181286, Mar. 2, 2018, 18 pages, Athens, Greece.

"LTE-NR coordination for Inter-modulation issue", Qualcomm Incorporated, NTT Docomo Inc, 3GPP TSG-RAN WG3 #99, R3-181095, Feb. 26-Mar. 2, 2018, 26 pages, Athens, Greece.

"LTE-NR resource allocation coordination over X2:CR for TS 36.423", Ericsson, 3GPP TSG-RAN WG3 Meeting #99, R3-181286, Feb. 26-Mar. 2, 2018, pp. 17, Athens, Greece.

British Search Report for GB1805814.9 dated Oct. 5, 2018.

International Search Report for PCT/JP2019/014740 dated Jun. 17, 2019 (PCT/ISA/210).

Written Opinion for PCT/JP2019/014740 dated Jun. 17, 2019 (PCT/ISA/237).

U.S. Office Action for U.S. Appl. No. 17/044,389 dated Feb. 24, 2022.

U.S. Notice of Allowance for U.S. Appl. No. 17/044,389 dated Jul. 13, 2022.

JP Office Action for JP Application No. 2022-079482, dated Feb. 14, 2023 with English Translation.

* cited by examiner

METHOD FOR COORDINATION OF RESOURCES BETWEEN A NEXT GENERATION RADIO ACCESS NETWORK NODE AND AT LEAST ONE FURTHER RAN NODE

CROSS-REFERENCE TO RELATED APPLICATIONS

The present application is a continuation application of U.S. patent application Ser. No. 17/044,389 filed on Oct. 1, 2020, which is a National Stage Entry of international application No. PCT/JP2019/014740 filed on Apr. 3, 2019, which claims the benefit of priority from British Patent Application No. 1805814.9 filed on Apr. 6, 2018, the disclosures of all of which are incorporated in their entirety by reference herein.

TECHNICAL FIELD

The present invention relates to a communication system. The invention has particular but not exclusive relevance to wireless communication systems and devices thereof operating according to the 3rd Generation Partnership Project (3GPP) standards or equivalents or derivatives thereof. The invention has particular although not exclusive relevance to resource coordination between radio access network (RAN) nodes of new radio (NR)/next generation (NG)/5G type technology and between such NR RAN nodes and RAN nodes of long term evolution (LTE) type technology.

BACKGROUND ART

The latest developments of the 3GPP standards are referred to as the Long Term Evolution (LTE) of Evolved Packet Core (EPC) network and Evolved UMTS Terrestrial Radio Access Network (E-UTRAN), also commonly referred as '4G'. In addition, the term '5G' and 'new radio' (NR) refer to an evolving communication technology that is expected to support a variety of applications and services. Various details of 5G networks are described in, for example, the 'NGMN 5G White Paper' V1.0 by the Next Generation Mobile Networks (NGMN) Alliance, which document is available from https://www.ngmn.org/5g-white-paper.html. 3GPP intends to support 5G by way of the so-called 3GPP Next Generation (NextGen) radio access network (RAN) and the 3GPP NextGen core (NGC) network.

Under the 3GPP standards, a NodeB (or an 'eNB' in LTE, 'gNB' in 5G) is base station of a RAN via which communication devices (user equipment or 'UE') connect to a core network and communicate with other communication devices or remote servers. Communication devices might be, for example, mobile communication devices such as mobile telephones, smartphones, user equipment, personal digital assistants, laptop/tablet computers, web browsers, e-book readers and/or the like. Such mobile (or even generally stationary) devices are typically operated by a user (although it is also possible to connect so-called 'Internet of Things' devices and similar machine-type communication devices to the network). For simplicity, the present application will use the term base station to refer to any such base stations and use the term mobile device or UE to refer to any such communication device. The core network (e.g. the EPC in case of LTE or the NGC in case of NR/5G) hosts functionality for subscriber management, mobility management, charging, security, and call/session management (amongst others), and provides connection for communication devices to external networks, such as the Internet.

NR supports multiple different numerologies (subcarrier spacing (SCS) and Orthogonal frequency-division multiplexing (OFDM) symbol lengths) which are summarised in the 3GPP technical standard TS38.211. Contrastingly, in LTE there is only a single (15 kHz) SCS. In NR each numerology is identified by a parameter, $\mu$, where $\mu=0$ represents the 15 kHz LTE. Currently, the SCS for other values of $\mu$ can, in effect, be derived from $\mu=0$ by scaling up in powers of 2 (i.e. SC=15×2 $\mu$ kHz). The current relationship in NR between the parameter, $\mu$, and SCS ($\Delta f$) is shown in Table 4.2-1 of TS38.211 as follows:

[Math. 1]

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In NR slot length also varies depending on numerology with a general tendency for slot length to get shorter with increasing SCS (for a normal cyclic prefix, slot length=½ $\mu$ ms; slots per subframe=2 $\mu$; and slots per frame=10×2 $\mu$).

[Math. 2]

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

The current relationship in NR, for normal cyclic prefixes, between the parameter, $\mu$, slots per frame $N_{slot}^{frame,\mu}$) and slots per subframe ($N_{slot}^{subframe,\mu}$)shown in Table 4.3.2-1 of TS38.211 as follows:

FIG. 1 illustrates different slot lengths for different NR numerologies (for $\mu=0$, $\mu=1$, and $\mu=2$).

The concept of bandwidth parts has also been introduced in NR. A carrier bandwidth part (BWP) is a contiguous set of physical resource blocks (PRBs), selected from a contiguous subset of common resource blocks defined for a given numerology, $\mu$, on a given carrier.

The common resource blocks are defined, for NR, as resource blocks are numbered from 0 and upwards in the frequency domain for a given SCS configuration (numerology, $\mu$).

The relation between the common resource block number nCRB in the frequency domain and resource elements (k, I) for SCS configuration $\mu$ is given by:

$$n_{CRB}^{\mu} = \left\lfloor \frac{k}{N_{sc}^{RB}} \right\rfloor \quad \text{[Math. 3]}$$

where K is defined relative to subcarrier 0 of a resource grid for SCS configuration $\mu$.

Subcarrier 0 of common resource block 0 for subcarrier spacing configuration coincides with a frequency reference point ('reference point A'), defined by higher layers, that is common for all SCS configurations.

A given UE can be configured with up to four carrier BWPs in the downlink with a single downlink carrier bandwidth part being active at a given time. The UE is not expected to receive a physical downlink shared channel (PDSCH), physical downlink control channel (PDCCH), CSI-RS, or TRS outside an active bandwidth part.

Similarly, a UE can be configured with up to four carrier BWPs in the uplink with a single uplink carrier bandwidth part being active at a given time. If a UE is configured with a supplementary uplink, the UE can in addition be configured with up to four carrier BWPs in the supplementary uplink with a single supplementary uplink carrier BWP being active at a given time. The UE does not transmit a physical uplink shared channel (PUSCH) or physical uplink control channel (PUCCH) outside an active bandwidth part.

FIG. 2 illustrates a network channel bandwidth that is split into a plurality of (three in the illustrated example) BWPs, each of which has a different associated SCS configuration, µ. FIG. 3 illustrates the concept of the common reference point ('reference point A') for different NR numerologies (SCS configurations).

It will be appreciated that the possibility of an LTE-compatible NR numerology, based on 15 kHz SCS, enabling identical time/frequency resource grids for both NR and LTE in a given coverage area/cell provides for possible coexistence between LTE and NR. Flexible NR scheduling with a scheduling granularity as small as one OFDM symbol or resource element (RE) can, theoretically, be used to avoid scheduled NR transmissions colliding with key LTE signal such as common reference signals (CRS), channel state information reference Signals (CSI-RS) and the signal/channels used for LTE initial access.

SUMMARY OF INVENTION

In order to support coexistence with LTE the NR radio access technology needs to be able to support flexible allocation of resources (e.g. time, frequency) between the NR RAT and LTE operating in the same block of spectrum (with possible bandwidths overlap). The NR RAT needs to be able to use these resources at least for downlink, uplink and sidelink. The flexible allocation of resources needs to be effective regardless of whether LTE is supported by the same base station as the NR RAT or the two RATs are each supported by a different respective base station. The resource allocation also needs to support backwards compatibility with legacy LTE terminals (including LTE Release 8 UEs and onwards and narrowband (NB) internet of things (IoT) UEs). Resource allocation granularity in the time/frequency domain, as well as the potential guards between NR and LTE resources also need to be determined for NR RATs.

Current proposals and agreements do not however support efficient and effective resource coordination between NR and/or LTE base stations.

The present invention seeks to provide methods and associated apparatus that support or improve upon the current proposals/agreements relating to resource coordination between RAN nodes in the above systems in an efficient and effective manner.

In one example aspect of the invention there is provided a method performed by a first radio access network (RAN) node configured to operate in accordance with next generation (5G/NR) standards, the method comprising: identifying resources, that the first radio access network (RAN) node is to use for transmissions, for protection from interference from at least one further RAN node; and sending, to the at least one further RAN node, information indicating the identified resources for protection from interference, wherein the information indicating the identified resources comprises a list of parameters based on which the at least one further RAN node is able to determine the resources for protection from interference.

In one example aspect of the invention there is provided a method performed by a first radio access network (RAN) node, the method comprising: receiving, from at least one further RAN node information indicating resources for protection from interference from the first RAN node at the at least one further RAN node, wherein the at least one further RAN node is configured to operate in accordance with next generation (5G/NR) standards and wherein the information indicating the identified resources comprises a list of parameters based on which the first RAN node is able to determine the resources for protection from interference; and determining whether the indicated resources can be protected from interference from the first RAN node; wherein when the first RAN node determines that the indicated resources can be protected from interference from the first RAN node, the first RAN node configures its transmissions to protect the indicated resources and sends, to the at least one further RAN node, an indication that that the indicated resources can be protected.

In one example aspect of the invention there is provided a radio access network (RAN) node comprising: a processor and a transceiver wherein the processor is configured: to control the transceiver to operate in accordance with next generation (5G/NR) standards; to identify resources, that the radio access network (RAN) node is to use for transmissions, for protection from interference from at least one further RAN node; and to control the transceiver to send, to the at least one further RAN node, information indicating the identified resources for protection from interference, wherein the information indicating the identified resources comprises a list of parameters based on which the at least one further RAN node is able to determine the resources for protection from interference.

In one example aspect of the invention there is provided a radio access network (RAN) node comprising: a processor and a transceiver wherein the processor is configured: to control the transceiver to receive, from at least one further RAN node information indicating resources for protection from interference from said RAN node at the at least one further RAN node, wherein the at least one further RAN node is configured to operate in accordance with next generation (5G/NR) standards, and wherein the information indicating the identified resources comprises a list of parameters based on which said RAN node is able to determine the resources for protection from interference; and to determine whether the indicated resources can be protected from interference from said RAN node; wherein when the processor determines that the indicated resources can be protected from interference from the first RAN node, the processor is configured to control transmissions from said transceiver to protect the indicated resources and to control the transceiver to send, to the at least one further RAN node, an indication that that the indicated resources can be protected.

Example aspects of the invention extend to computer program products such as computer readable storage media having instructions stored thereon which are operable to program a programmable processor to carry out a method as described in the example aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

BRIEF DESCRIPTION OF DRAWINGS

Example embodiments of the invention will now be described by way of example only with reference to the attached figures in which.

DESCRIPTION OF EMBODIMENTS

Overview

Figure 1:
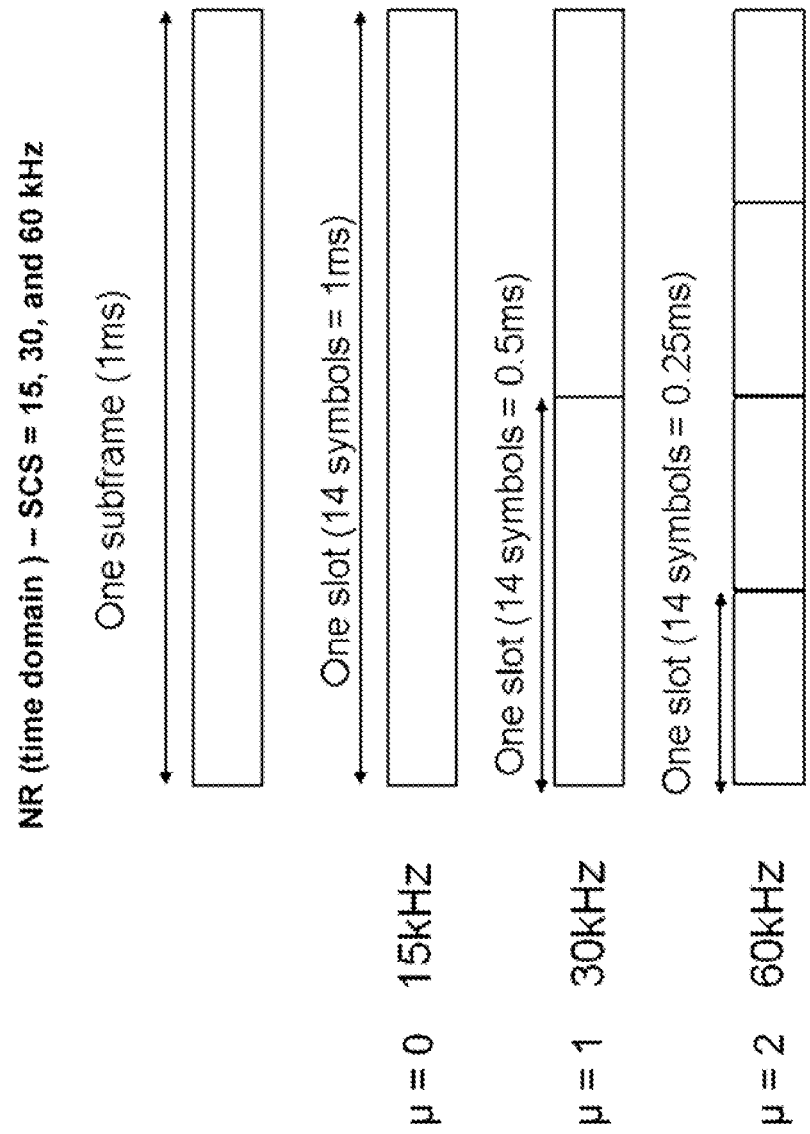
FIG. 1 illustrates different slot lengths for different new radio numerologies.
Figure 2:
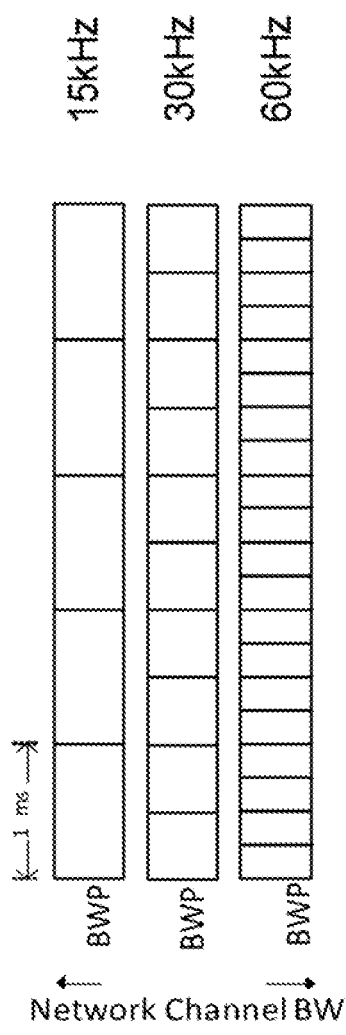
FIG. 2 illustrates a network channel bandwidth that is split into a plurality of bandwidth parts.
Figure 3:
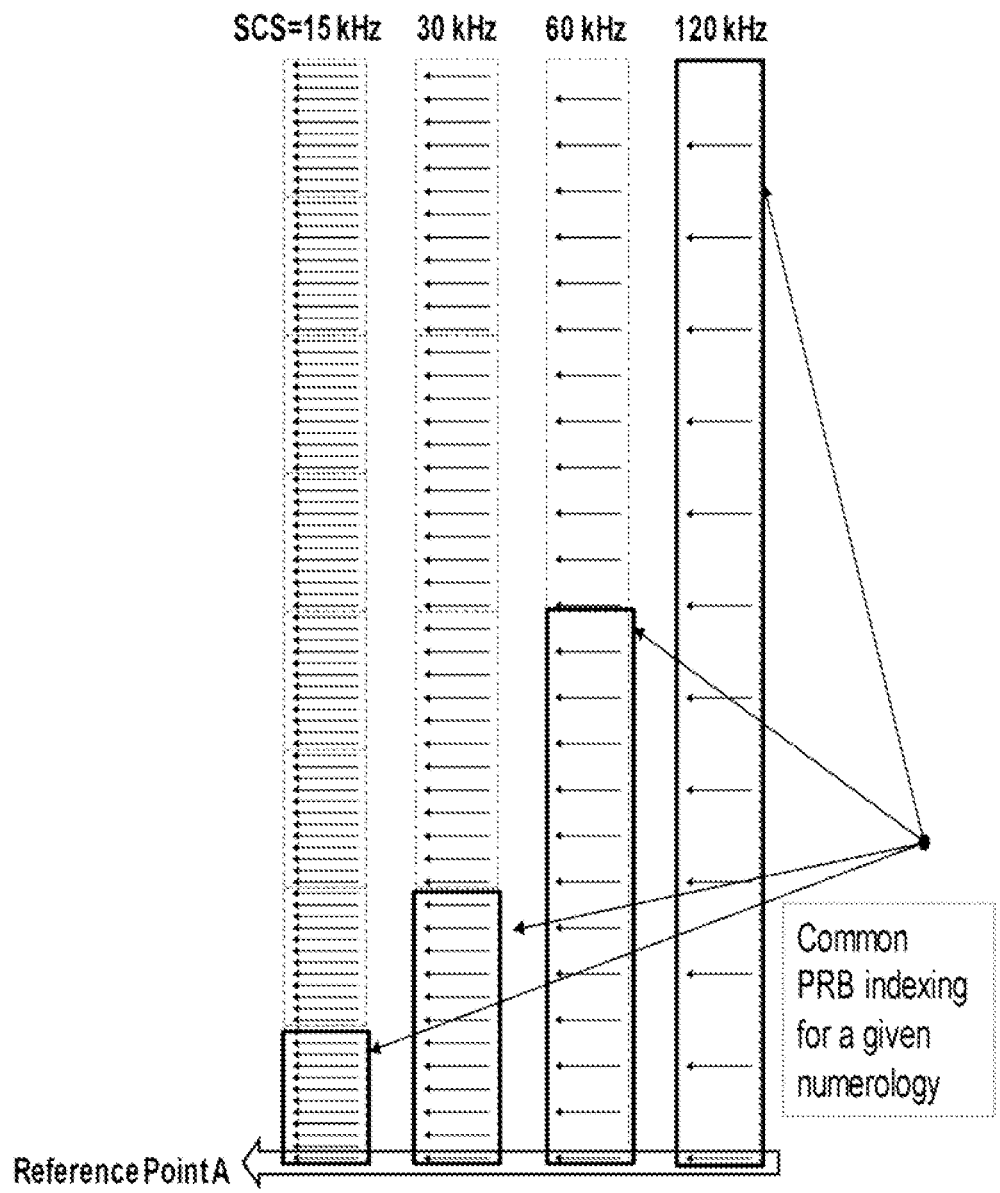
FIG. 3 illustrates a common reference point for different numerologies in NR.
Figure 4:
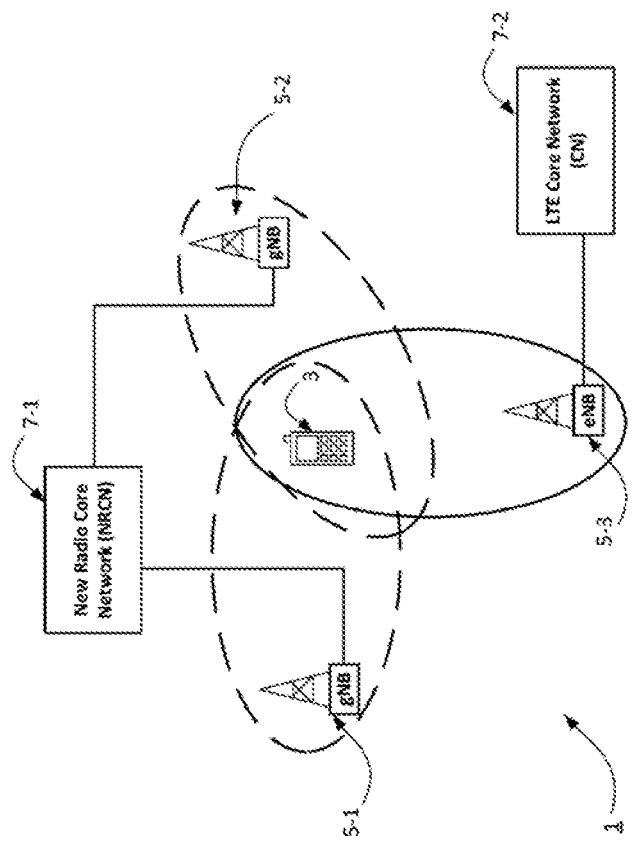
FIG. 4 illustrates schematically a cellular telecommunication system.

FIG. 4 schematically illustrates a telecommunication network 1 in which items of user equipment (UEs) 3 (mobile telephones and/or other communication devices) can communicate with each other via radio access network (RAN) nodes 5-1, 5-2, 5-3. In the illustrated example, the RAN nodes comprise two NR/5G base stations or 'gNBs' 5-1, 5-2 and an LTE base station or 'eNB' 5-3, using an appropriate radio access technology (RAT). In this example, the UE 3 is capable of communicating as an LTE UE via the eNB 5-3. The UE 3 is also capable of communicating as an NR/5G UE via a gNB 5-1, 5-2. It will be appreciated, however, that the UE 3 may be a legacy UE that need not have 5G capability or an NR UE that only supports the 5G capability.

It will also be appreciated that whilst the RAN nodes are described as separate entities for the purposes of illustration, a single RAN node 5 may comprise the functionality of an integrated eNB 5-3 function and gNB 5-1, 5-2 function and may support communication between the integrated eNB 5-3 function and gNB 5-1, 5-2 function as if they were a separate eNB and gNB.

Moreover, as those skilled in the art will appreciate, whilst one UE 3 and three RAN nodes 5 are shown in FIG. 4 for illustration purposes, the system, when implemented, will typically include other base stations and mobile devices.

In this example, the gNBs 5-1, 5-2 and eNB 5-3 each operate one or more associated cells. UEs 3 connect to an appropriate cell (depending on their location and possibly on other factors, e.g. signal conditions, subscription data, capability, and/or the like) by establishing a radio resource control (RRC) connection with a corresponding RAN node 5 (base station) 5 operating that cell.

Each RAN node 5 is connected to a respective core network 7-1, 7-2 via an appropriate interface. The core networks 7 include an NR core network 7-1 that comprises the NR/5G functions required for supporting communication of the UE 3 via the gNBs 5-1, 5-2. The core network 7-1 includes, for example, functions for providing control plane management, user plane management, mobility management etc.. The core networks 7 include an LTE core network 7-2 (evolved packet core (EPC)) that comprises the partial or full EPC functionality for supporting communication of the UE 3 via the eNB 5-3. It will be appreciated that the NR core network 7-1 and LTE core network 7-2 may form different parts of a single integrated core network.

The eNB 5-3 and gNB 5-1, 5-2 may be configured in a dual connectivity deployment (i.e. an E-UTRA-NR dual connectivity (EN-DC) deployment) in which, for example the eNB 5-3 may operate as a master base station whilst the gNB 5-1, 5-2 operates as a secondary base station.

Figure 5:
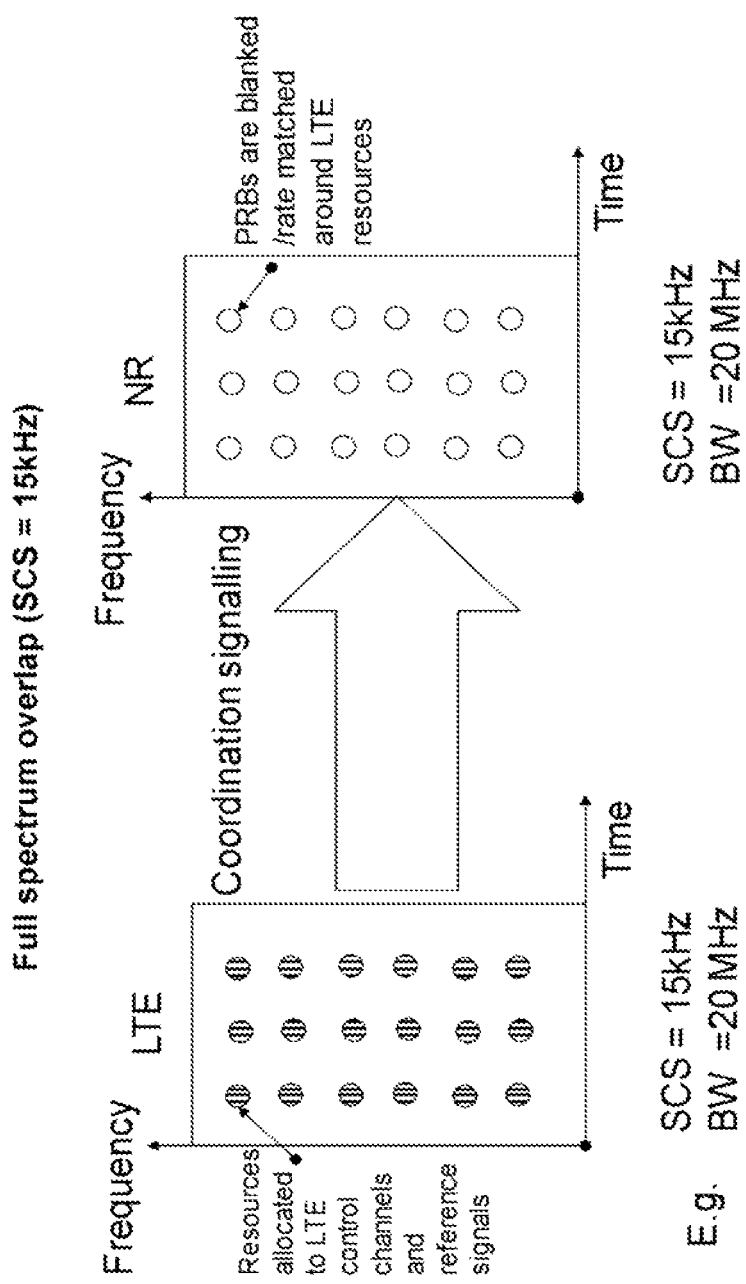
FIG. 5 illustrates resource coordination between an LTE RAN node and an NR RAN node to inhibit interference from the NR RAN node to the LTE RAN node.

FIG. 5 illustrates resource coordination between an LTE node (e.g. eNB 5-3) and an NR RAN node (e.g. gNB 5-1) to inhibit interference from the NR node to the LTE node. In the example of FIG. 5, there is full spectrum overlap between the LTE and the NR RAN nodes 5 and thus both the subcarrier spacing and the bandwidth used by the eNB 5-3 and gNB 5-1.

Specifically, to support LTE-NR coexistence, the eNB 5-3 is able to send resource coordination signalling to the gNBs 5-1, 5-2 to indicate, either explicitly or implicitly, resources (physical resource blocks (PRBs)) allocated for critical LTE transmissions (e.g. allocated to LTE control channels and reference signals) and that are therefore to be protected at the NR side. The gNBs 5-1, 5-2 are able to either 'blank' or 'mute' the corresponding PRBs (i.e. by avoiding transmission on those PRBs altogether or by reducing the transmission power for those resource blocks) or rate match around the LTE resources.

For example, as explained above, based on Reference Point A, PRBs with different subcarrier spacing numerologies start from the same point in the frequency domain. The gNB 5-1, 5-2 can thus calculate the location of the LTE downlink signals and channels, to be protected, based on the parameters in the coordination signalling from eNB 5-3 (which may include, for example, Reference Point A, SCS, total bandwidth, PRB and resource element level bitmaps).

Beneficially, the gNBs 5-1, 5-2 and eNB 5-3 are also beneficially able to coordinate resources among themselves to inhibit interference, on resources used by the gNBs 5-1, 5-2 for critical NR transmissions, arising either from LTE transmissions via the eNB 5-3 or from other NR transmissions via another gNB 5-2, 5-1. Thus, the gNBs 5-1, 5-2 and eNB 5-3 are beneficially not only able to inhibit potential interference, arising from NR transmissions, on resources used by the eNB 5-3 for critical LTE transmissions, but also to inhibit potential interference on resources used by the eNB 5-3 for critical NR transmissions.

Figure 6:
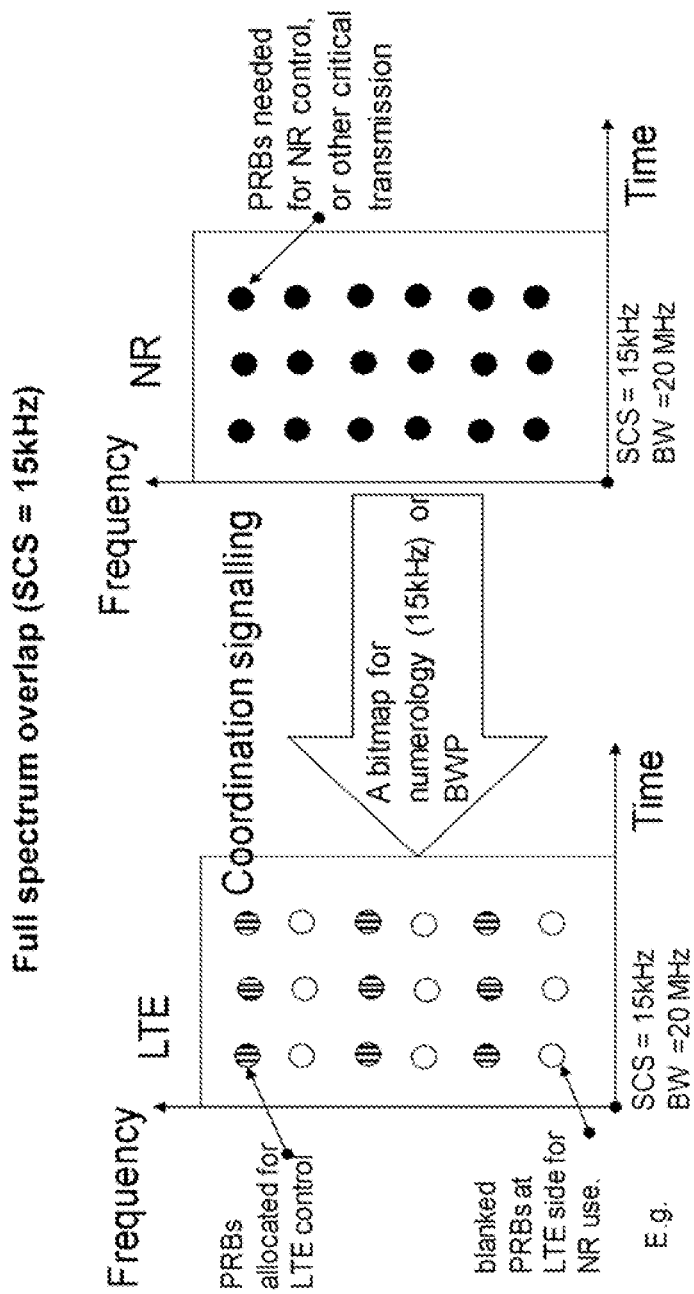
FIG. 6 illustrates resource coordination between an NR RAN node and an LTE RAN node to inhibit interference from the LTE RAN node to the NR RAN node in the case of full spectrum overlap.

FIG. 6, for example, illustrates resource coordination between an NR RAN node (e.g. gNB 5-1, 5-2) and an LTE RAN node (e.g. eNB 5-3) to inhibit interference from the eNB 5-3 (referred to herein as the 'target' or 'aggressor' node) to the gNB 5-1, 5-2 (referred to herein as the 'source' or 'victim' node) in the case of full spectrum overlap (e.g. for the same numerology (SCS=15 kHz) and same bandwidth sizes).

Specifically, to support LTE-NR coexistence, the gNBs 5-1, 5-2 are able to send resource coordination signalling to the eNB 5-3 to indicate the PRBs required for critical NR transmissions (e.g. NR control channels, reference signals or the like) and that are therefore to be protected at the LTE side. The coordination signalling may also include other related information such as, for example, an indication of the frequency reference point ('Reference Point A'). In effect, therefore, the coordination signalling requests the protection of certain time frequency resources at the LTE side.

The eNB 5-3 determines if it is able to 'blank' or 'mute' the PRBs corresponding the indicated resources. In the event that the target eNB 5-3 determines that is can avoid transmitting in the time/frequency resources indicated by the requesting source gNB 5-1, 5-2 then it blanks/mutes those time/frequency resources and informs the requesting gNB 5-1, 5-2 accordingly. The blanking or muting of PRBs for NR use may be achieved, for example, by means of using 'almost blank subframes' (ABS) to avoid transmission on the PRBs and/or by reducing the transmission power for those resource blocks (e.g. by adjusting the relative narrow-band transmit power (RNTP)).

In the event that the target eNB 5-3 determines that it cannot avoid transmitting in the time/frequency resources indicated by the requesting source gNB 5-1, 5-2 then it informs the requesting gNB 5-1, 5-2 that the request cannot be met.

In the example of FIG. 6, the target eNB 5-3 requires some of the indicated resources for its own critical LTE transmissions. However, even though the eNB 5-3 cannot blank/mute PRBs corresponding to all the indicated resources, the eNB 5-3 is beneficially still able to selectively blank/mute the other PRBs, indicated by the resource coordination signalling, that are not required by the LTE critical transmissions (referred to as 'partial blanking'). Accordingly, the target eNB 5-3 determines the PRBs in which it can avoid transmitting and informs the requesting gNB 5-1, 5-2 accordingly by providing a description of the time/frequency resources in which it can avoid transmitting (typically a sub-set of the time/frequency resources indicated by the requesting source gNB 5-1, 5-2). The description of time/frequency resources may beneficially be in the same format as the description of time/frequency resources provided in the original request.

Figure 7:
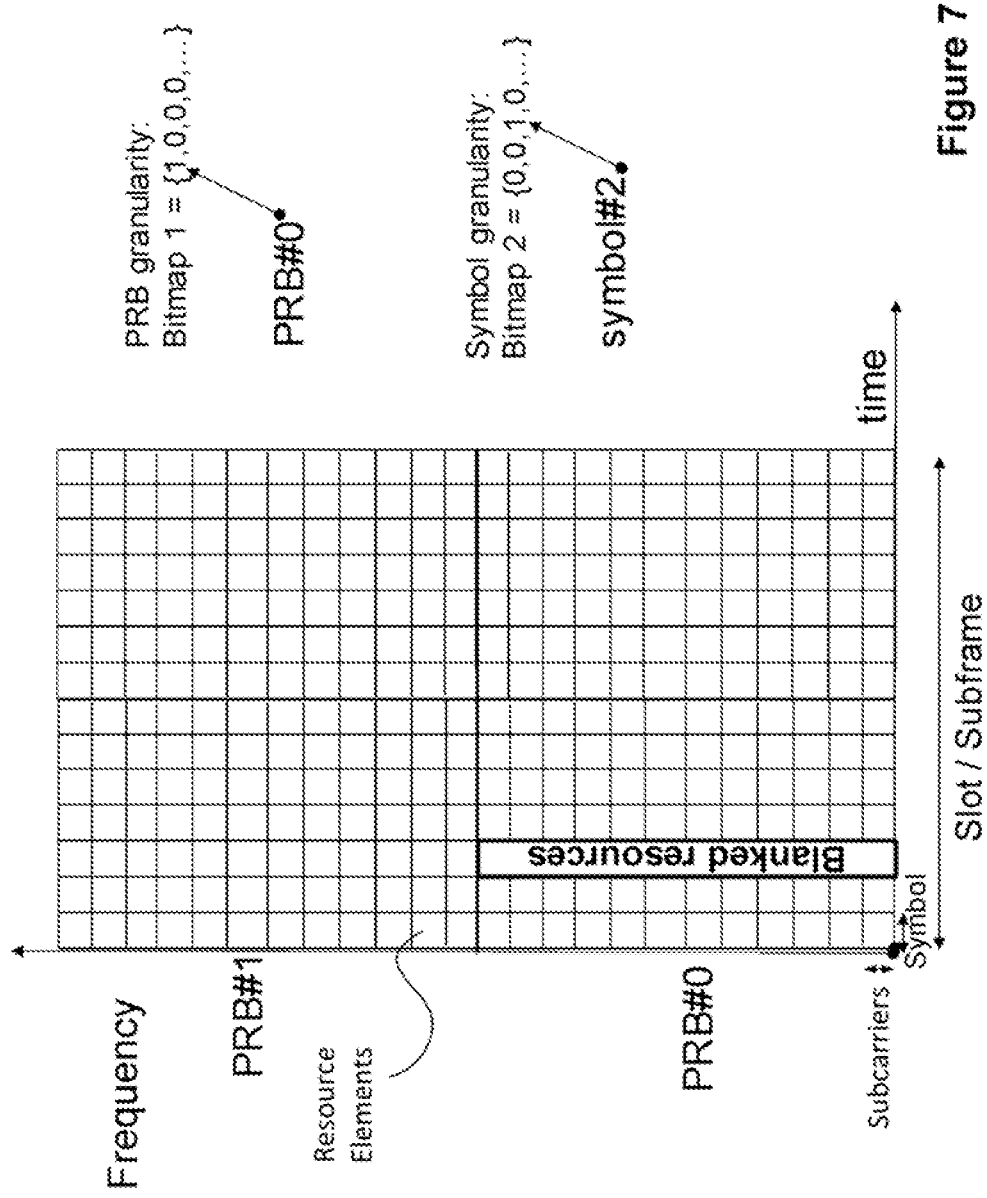
FIG. 7 illustrates exemplary bitmaps that may be used to signal resources requiring protection.

In this example, as shown in FIG. 7, the resource coordination signalling generated by the gNB 5-1, 5-2 and sent to the eNB 5-3 includes an indication of it SCS configuration (numerology) and comprises two bitmaps for indicating the NR resources required for critical transmissions. The two bitmaps comprise a one-dimensional bitmap (Bitmap 1) for indicating the NR frequency (e.g. PRB) allocation required for critical transmissions and another one-dimensional bitmap (Bitmap 2) for indicating the time (e.g. symbol, slot or subframe) allocation required for critical transmissions. It will be appreciated that whilst two separate bitmaps are used to indicate the resources requiring protection in this example, a single 'super' two-dimensional bitmap may be used to indicate both the frequency and time allocation.

Whether a one-dimensional or two-dimensional bitmap is used for indicating the time-domain pattern, the bitmap periodicity may be used to indicate the repetition pattern of the bitmap (e.g. every 14 symbols, or every other 14 symbols). For example, the bitmap may be applied in every slot, or only in selection of slots (e.g. slots#1, 4, 7, etc).

As illustrated in FIG. 7 the frequency allocation is typically indicated in the corresponding bitmap (whether one-dimensional or two-dimensional) at a PRB level of granularity (i.e. a 1 bit of the bitmap corresponds to 1 PRB) although it will be understood that the frequency allocation could be indicated in the bitmap at a subcarrier level of granularity (i.e. a 1 bit of the bitmap corresponds to 1 subcarrier). The time allocation is typically indicated in the bitmap (whether one-dimensional or two-dimensional) at a symbol level of granularity (i.e. a 1 bit of the bitmap corresponds to 1 symbol) although it will be understood that the frequency allocation could be indicated in the bitmap at a slot or even subframe level of granularity (i.e. a 1 bit of the bitmap corresponds to 1 slot or one subframe).

In the example of FIG. 6, the source gNB 5-1, 5-2 generates the bitmap(s) for SCS=15 kHz (and/or a specific NR BWP), to indicate the location of its critical transmission to be protected at the LTE side.

Figure 8:
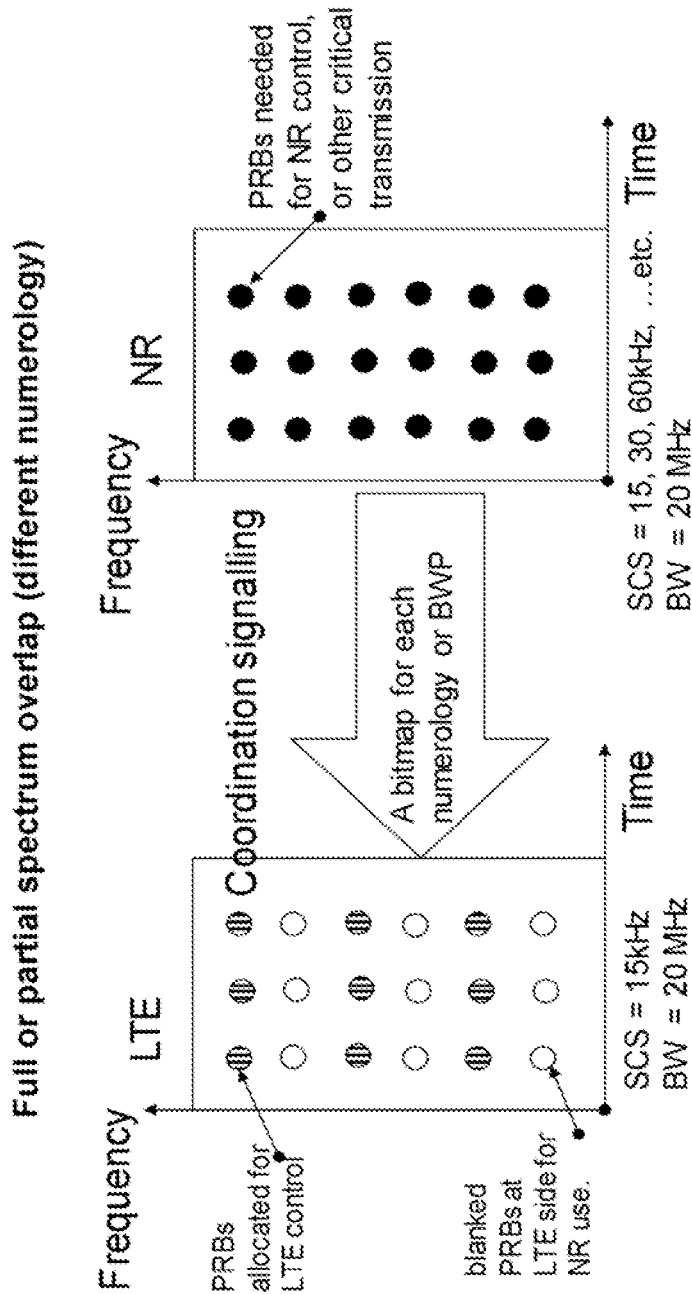
FIG. 8 illustrates resource coordination between an NR RAN node and an LTE RAN node to inhibit interference from the LTE RAN node to the NR RAN node in the case of full or partial spectrum overlap.

FIG. 8, for example, illustrates resource coordination between an NR RAN node (e.g. gNB 5-1, 5-2) and an LTE RAN node (e.g. eNB 5-3) to inhibit interference from the eNB 5-3 (referred to herein as the 'target' or 'aggressor' node) to the gNB 5-2, 5-3 (referred to herein as the 'source' or 'victim' node) when there may only be a partial spectrum overlap (e.g. as when the NR RAN using different SCS in different BWPs).

Specifically, to support LTE-NR coexistence, the gNBs 5-1, 5-2 are able to send resource coordination signalling to the eNB 5-3 to indicate for each NR numerology or BWP the PRBs required for critical NR transmissions (e.g. NR control channels, reference signals or the like). The coordination signalling may also include other related information such as, for example, an indication of the frequency reference point ('Reference Point A'). In effect, therefore, the coordination signalling requests the protection of certain time frequency resources at the LTE side.

The eNB 5-3 determines if it is able to 'blank' or 'mute' the PRBs corresponding the indicated resources. In the event that the target eNB 5-3 determines that it can avoid transmitting in the time/frequency resources indicated by the requesting source gNB 5-1, 5-2 then it blanks/mutes those time/frequency resources and informs the requesting gNB 5-1, 5-2 accordingly. The blanking or muting of PRBs for NR use may be achieved, for example, by avoiding transmission on the PRBs and/or by reducing the transmission power for those resource blocks as described above.

In the event that the target eNB 5-3 determines that it cannot avoid transmitting in the time/frequency resources indicated by the requesting source gNB 5-1, 5-2 then it informs the requesting gNB 5-1, 5-2 that the request cannot be met.

In the example of FIG. 8, the target eNB 5-3 requires some of the indicated resources for its own critical LTE transmissions. However, even though the eNB 5-3 cannot blank/mute PRBs corresponding to all the indicated resources, the eNB 5-3 is beneficially still able to selectively blank/mute the other PRBs, indicated by the resource coordination signalling, that are not required by the LTE critical transmissions. Accordingly, the target eNB 5-3 determines the PRBs in which is can avoid transmitting and informs the requesting source gNB 5-1, 5-2 accordingly by providing a description of the time/frequency resources in which it can avoid transmitting (e.g. in the same format as the description of time/frequency resources provided in the original request).

In the example of FIG. 8, the source gNB 5-1, 5-2 generates separate respective bitmap(s) (e.g. as described with reference to FIG. 7) for each SCS (e.g. 15 kHz, 30 kHZ, 60 kHz, . . . ) and/or specific BWP, to indicate the location of its critical transmissions to be protected at the LTE side. It will be appreciated that a single 'super' two-dimensional bitmap may be used for each SCS/BWP, as described above, to indicate both the frequency and time allocation.

It will be appreciated that the resource coordination signalling may be based on the signalling of one specific numerology at the same time (e.g. for SCS=15 kHz) with one frequency (e.g. PRB-level) bitmap and one time (e.g. symbol-level within a slot/subframe) bitmap (or one super bitmap for frequency and time). The resource coordination signalling may be based on signalling of a plurality of numerologies at the same time (e.g. for SCS=15 kHz and SCS=30 kHz) with a respective frequency bitmap and respective time bitmap for each numerology.

Figure 9:
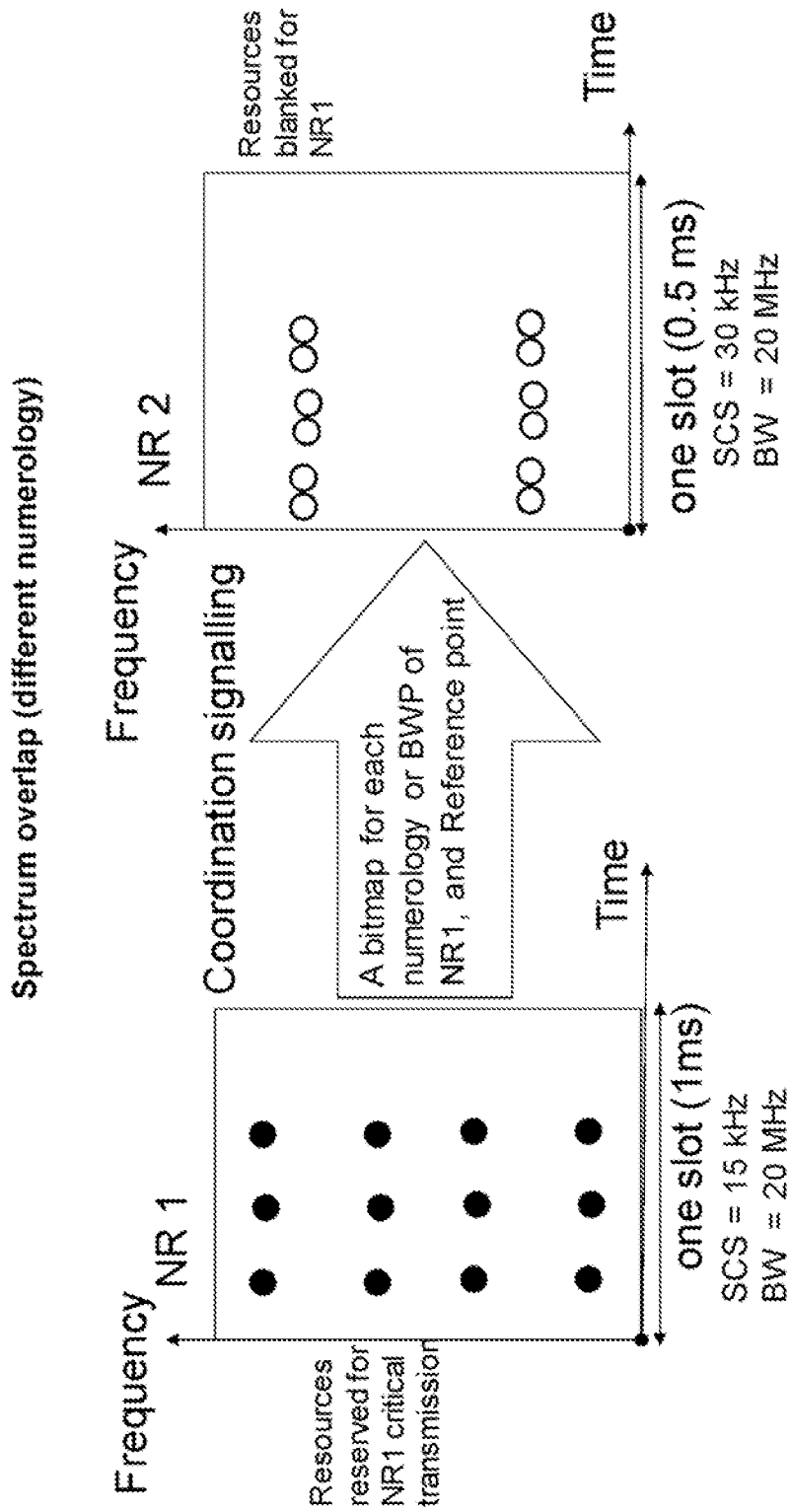
FIG. 9 illustrates resource coordination between an NR RAN node and another RAN node to inhibit interference from the NR RAN node to the other NR RAN node in the case of partial spectrum overlap.

FIG. 9, for example, illustrates resource coordination between a first NR RAN node (e.g. gNB 5-1, 5-2) and a second NR RAN node (e.g. gNB 5-1, 5-2) to inhibit interference from first gNB 5-1, 5-2 (referred to herein as the 'target' or 'aggressor' node) to the second gNB 5-2, 5-3 (referred to herein as the 'source' or 'victim' node) when there is a spectrum overlap (e.g. when the first NR RAN node is using a different SCS to the second NR RAN node). In this example, the first NR RAN node uses an SCS of 15 kHz with a slot length of 1 ms whilst the second NR RAN node uses an SCS of 30 kHz with a slot length of 0.5 ms Specifically, a gNB 5-1, 5-2, when operating as a 'source' or 'victim' NR node, is able to send resource coordination signalling to the other gNB 5-1, 5-2 (when operating as a 'target' or 'aggressor' NR node) to indicate for each NR numerology (or BWP) the PRBs required for critical NR transmissions (e.g. NR control channels, reference signals or the like). The coordination signalling may also include other related information such as, for example, an indication of the frequency reference point ('Reference Point A'). In effect, therefore, the coordination signalling requests the protection of certain time frequency resources at the LTE side.

The target gNB 5-1, 5-2 determines if it is able to 'blank' or 'mute' the PRBs corresponding the indicated resources. In the event that the target gNB 5-1, 5-2 determines that is can avoid transmitting in the time/frequency resources indicated by the requesting source gNB 5-1, 5-2 then it blanks/mutes those time/frequency resources and informs the requesting source gNB 5-1, 5-2 accordingly. The blanking or muting of PRBs for NR use may be achieved, for example, by avoiding transmission on the PRBs and/or by reducing the transmission power for those resource blocks as described above.

In the event that the gNB 5-1, 5-2 determines that it cannot avoid transmitting in the time/frequency resources indicated by the requesting source gNB 5-1, 5-2 then it informs the requesting gNB 5-1, 5-2 that the request cannot be met.

The target gNB 5-1, 5-2, is able to selectively blank/mute some of the corresponding PRBs even if the target gNB 5-1, 5-2 requires some of the indicated resources for its own critical NR transmissions.

In the example of FIG. 9, the source gNB 5-1, 5-2 generates separate respective bitmap(s) (e.g. as described with reference to FIG. 7) for each SCS and/or BWP of the victim NR node, to indicate the location of its critical transmissions to be protected at the target gNB 5-1, 5-2. It will be appreciated that a single 'super' two-dimensional bitmap may be used for each SCS/BWP, as described above, to indicate both the frequency and time allocation. Moreover, to avoid the potential processing/communication overheads of defining a bitmap on a per BWP basis (of which there may be many), a single 'super' bitmap could be used with frequency granularity corresponding to the minimum supported PRB/subcarrier size (e.g. the PRB/subcarrier size associated with an SCS of 15 KHz) of the numerologies used whilst the time granularity corresponds to the minimum supported time granularity (e.g. the symbol/slot/subframe granularity associated with an SCS of 60 KHz and slot length of 0.5 ms).

In the above described LTE-NR examples it will be appreciated that, the source gNB 5-1, 5-2 may, beneficially, calculate (internally) the location of the PRBs to be blanked based on knowledge of the LTE numerology (i.e. PRB-level granularity, and subframe-level granularity) and send bitmap(s) based on this calculation to the LTE node. For example, in FIG. 8, an NR node with SCS=30 kHz has a symbol length equal to half that of the LTE node (which has SCS=15 kHz), but since the LTE node operates at a PRB-level granularity, then NR node may calculate the location of the LTE side PRBs that contain the NR symbols that are to be protected (blanked/muted) on the LTE side. In this case, the NR node need only indicate, in the bitmaps, the location of the PRBs based on this calculation rather than the LTE node having to work out the location of the PRBs from a bitmap identifying only the NR symbols.

It will also be appreciated that, in the above described examples, as an alternative to providing explicit signalling via one or more bitmaps, the source gNB 5-1, 5-2 may provide a list of parameters (e.g. cell configuration parameters) as part of its resource coordination signalling to target eNB 5-3/gNB 5-1, 5-3, based on which the target eNB 5-3/gNB 5-1, 5-3 can determine the pattern of time/frequency resources to be blocked/muted (such as frequency domain PRBs/REs, and time domain symbols/slots). For example, the source gNB 5-1, 5-2 may provide cell configuration parameters such as cell ID, number of antenna ports, BWP size, centre carrier frequency, SRS configuration, and/or any PRB/resource.

User Equipment

Figure 10:
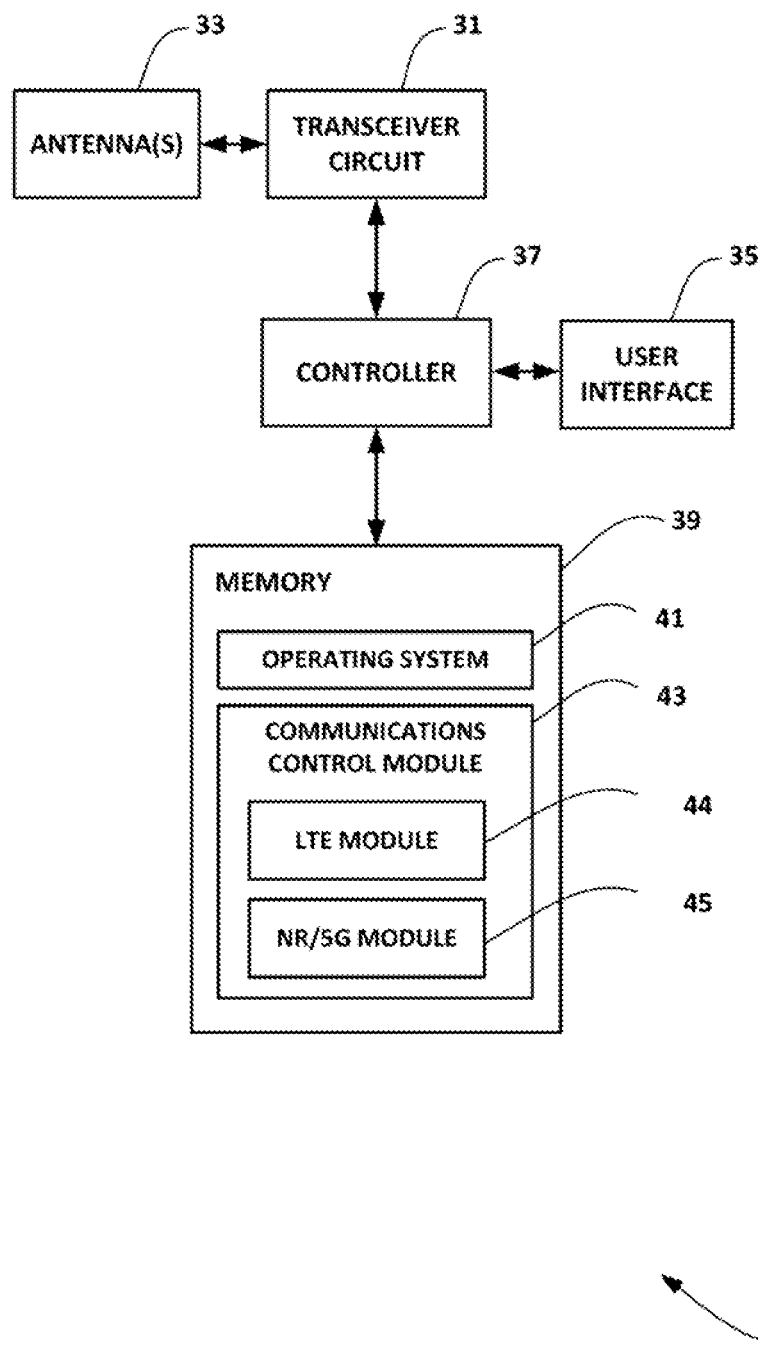
FIG. 10 is a block diagram of user equipment which may form part of the system shown in FIG. 4.

FIG. 10 is a block diagram illustrating the main components of the UE 3 shown in FIG. 4 (e.g. a mobile telephone or other user equipment). As shown, the UE 3 has a transceiver circuit 31 that is operable to transmit signals to and to receive signals from a base station 5 via one or more antenna 33.

The UE 3 has a controller 37 to control the operation of the UE 3. The controller 37 is associated with a memory 39 and is coupled to the transceiver circuit 31. Although not necessarily required for its operation, the UE 3 might of course have all the usual functionality of a conventional mobile telephone 3 (such as a user interface 35) and this may be provided by any one or any combination of hardware, software and firmware, as appropriate. Software may be pre-installed in the memory 39 and/or may be downloaded via the telecommunications network or from a removable data storage device (RMD), for example.

The controller 37 is configured to control overall operation of the UE 3 by, in this example, program instructions or software instructions stored within memory 39. As shown, these software instructions include, among other things, an operating system 41 and a communications control module 43 comprising a number of radio access technology modules (such as an LTE module 44 and/or a NR/5G module 45.

The communications control module 43 is operable to control the communication between the UE 3 and a base station 5 (and other communication devices connected to the base station 5, such as further mobile devices and/or network nodes). The LTE module 44 is responsible for operating the UE as the LTE UE and, in particular, for managing communication with the eNB 5-3 operating in accordance with current LTE standards (e.g. 3G/4G base station) and other nodes/devices connected to such a base station. The NR/5G module 45 is responsible for operating the UE as the NR/5G UE and, in particular for managing communication with the gNBs 5-1, 5-2 operating in accordance with NextGen (5G) standards and other nodes/devices connected to such a NextGen base station.

NR RAN Node

Figure 11:
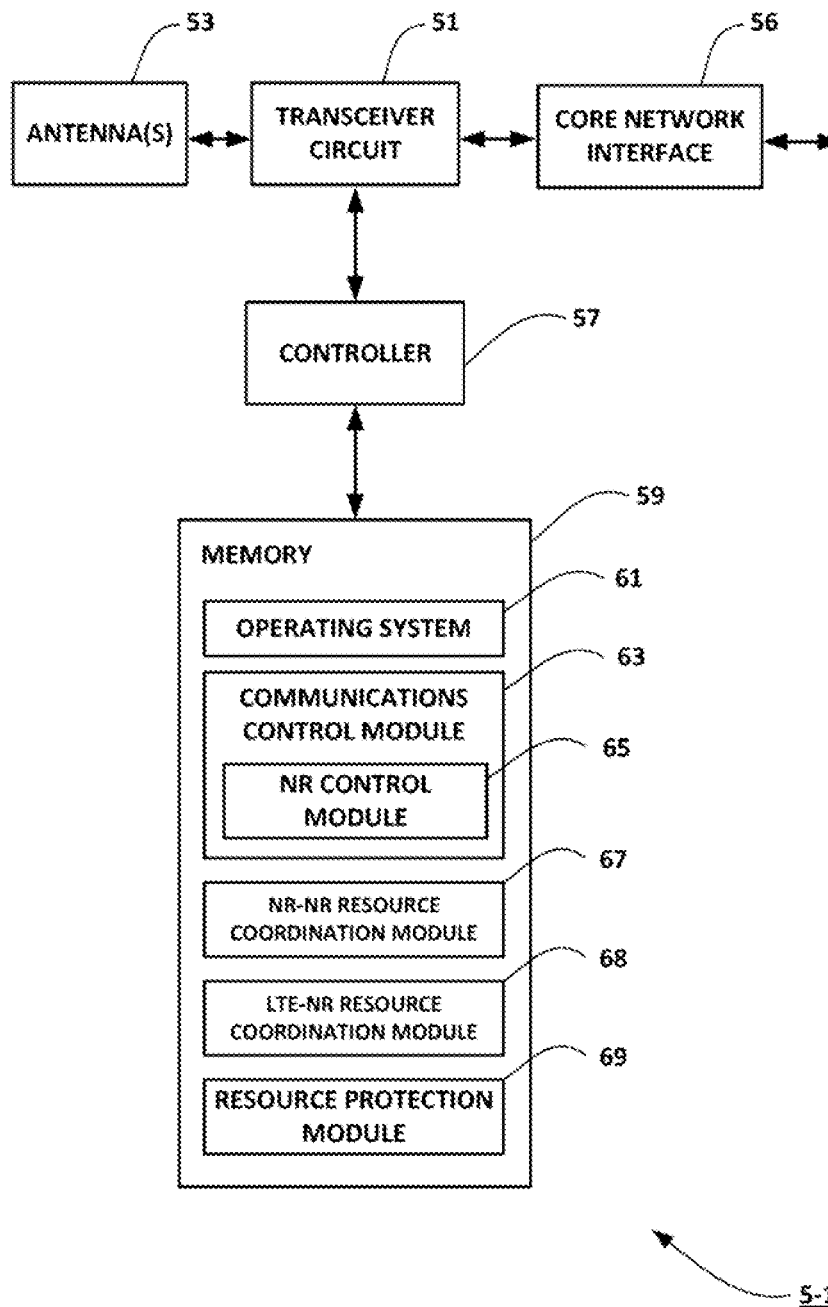
FIG. 11 is a block diagram of an NR radio access network node forming part of the system shown in FIG. 4.

FIG. 11 is a block diagram illustrating the main components of a gNB 5-1, 5-2 shown in FIG. 4. As shown, the gNB 5-1, 5-2 has a transceiver circuit 51 for transmitting signals to and for receiving signals from the communication devices (such as UE 3) via one or more antenna 53, and at least one core network interface 55 for transmitting signals to and for receiving signals from the NR core network 7-1.

The gNB 5-1, 5-2 has a controller 57 to control the operation of the gNB 5-1, 5-2. The controller 57 is associated with a memory 59. Although not necessarily shown in FIG. 11, the gNB 5-1, 5-2 will of course have all the usual functionality of an NR gNB and this may be provided by any one or any combination of hardware, software and firmware, as appropriate. Software may be pre-installed in the memory 59 and/or may be downloaded via the communications network 1 or from a removable data storage device (RMD), for example. The controller 57 is configured to control the overall operation of the gNB 5-1, 5-2 by, in this example, program instructions or software instructions stored within memory 59. As shown, these software instructions include, among other things, an operating system 61, a communications control module 63 comprising an NR control module 65, an NR-NR resource coordination module 67, an LTE-NR resource coordination module 68 and a resource protection module 69.

The communications control module 63 is operable to control the communication between the gNB 5-1, 5-2, the UE 3 and other network entities that are connected to the gNB 5-1, 5-2 (including other base stations 5 and NR core network entities). The NR control module 65 is responsible for operating the gNB 5-1, 5-2 as an NR base station and, in particular for managing the communication with the NR core network 7-1, with other and with the UE 3 when operating as an NR UE in accordance with NextGen (5G) standards (and/or with one or more NR dedicated UEs). The NR control module 65 manages, for example, communication in accordance with one or more NR numerologies in one or more bandwidth parts.

The NR-NR resource coordination module 67 manages the generation, transmission, and receipt of signalling, between the gNB 5-1, 5-2 and other gNBs 5-1, 5-2, that relates to the coordination of resources between those base stations to avoid/inhibit interference to critical transmissions. The NR-NR resource coordination module 67 manages, for example, the generation and transmission of the bitmaps (and/or parameter lists) necessary for indicating to another gNB 5-1, 5-2 the resources which, when the gNB 5-1, 5-2 operates as a source or victim, the gNB 5-1, 5-2 is requesting to be blanked (e.g. indicating the time/frequency resources which it requires for critical transmissions). The NR-NR resource coordination module 67 also manages, for example, the receipt and handling of resource coordination related signalling from other gNBs 5-1, 5-2.

The LTE-NR resource coordination module 68 manages the generation, transmission, and receipt of signalling, between the gNB 5-1, 5-2 and eNB 5-3, that relates to the coordination of resources between the NR and LTE base stations to avoid/inhibit interference to critical transmissions. The LTE-NR resource coordination module 68 manages, for example, the generation and transmission of the bitmaps (and/or parameter lists) necessary for indicating to the eNB 5-3 the resources which, when the gNB 5-1, 5-2 operates as a source or victim, the gNB 5-1, 5-2 is requesting to be blanked (e.g. indicating the time/frequency resources which it requires for critical transmissions). The LTE-NR resource coordination module 68 also manages, for example, the receipt and handling of resource coordination related signalling from eNBs 5-3.

The resource protection module 69 manages the blank/muting of resources 9 (e.g. by avoiding transmissions using those resources or by reducing the power of such transmissions), when the gNB 5-1, 5-2 operates as a target or aggressor node, to protect critical transmissions of other gNBs 5-1, 5-2 that operate as source or victim nodes.

LTE RAN Node

Figure 12:
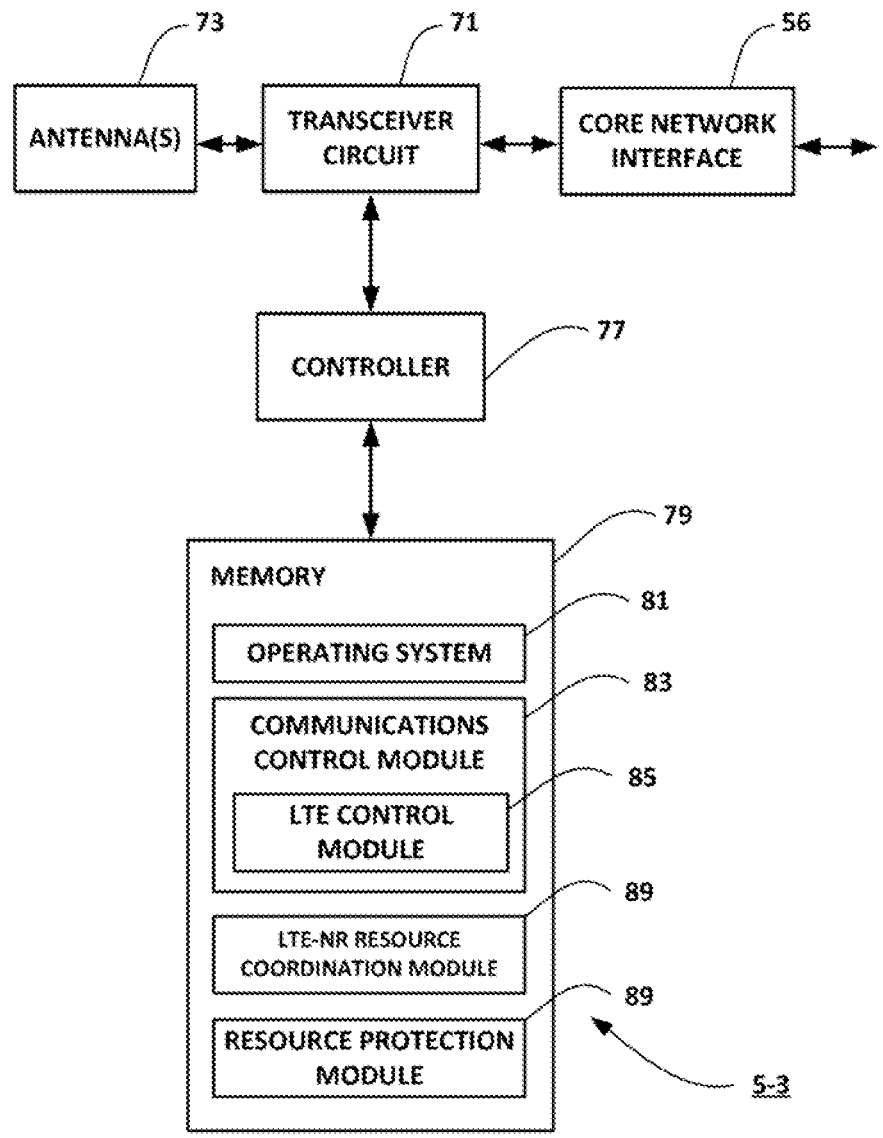
FIG. 12 is a block diagram of a LTE radio access network node forming part of the system shown in FIG. 4.

FIG. 12 is a block diagram illustrating the main components of an eNB 5-3 shown in FIG. 4. As shown, the eNB 5-3 has a transceiver circuit 71 for transmitting signals to and for receiving signals from the communication devices (such as UE 3) via one or more antenna 73, and at least one core network interface 75 for transmitting signals to and for receiving signals from the LTE core network 7-2.

The eNB 5-3 has a controller 77 to control the operation of eNB 5-3. The controller 77 is associated with a memory 79. Although not necessarily shown in FIG. 12, the eNB 5-3 will of course have all the usual functionality of an LTE eNB and this may be provided by any one or any combination of hardware, software and firmware, as appropriate. Software may be pre-installed in the memory 79 and/or may be downloaded via the communications network 1 or from a removable data storage device (RMD), for example. The controller 77 is configured to control the overall operation of the eNB 5-3 by, in this example, program instructions or software instructions stored within memory 79. As shown, these software instructions include, among other things, an operating system 81, a communications control module 83 comprising an LTE control module 85, an LTE-NR resource coordination module 88 and a resource protection module 89.

The communications control module 83 is operable to control the communication between the eNB 5-3, the UE 3 and other network entities that are connected to the eNB 5-3 (including other base stations 5 and LTE core network entities). The LTE control module 85 is responsible for operating the eNB 5-3 as an LTE base station and, in particular for managing the communication with the LTE core network 7-2, with other and with the UE 3 when operating as an LTE UE in accordance with the LTE 3GPP standards. The LTE control module 85 manages, for example, communication in accordance the LTE numerology.

The LTE-NR resource coordination module 87 manages the generation, transmission, and receipt of signalling, between the eNB 5-3 and gNBs 5-1, 5-2, that relates to the coordination of resources between those base stations to avoid/inhibit interference to critical transmissions. The LTE-NR resource coordination module 87 manages, for example, the receipt and handling of the bitmaps (and/or parameter lists) necessary for indicating to the eNB 5-3 the resources which, a source gNB 5-1, 5-2 is requesting to be blanked (e.g. indicating the time/frequency resources which it requires for critical transmissions). The LTE-NR resource coordination module 87 also manages, for example, the generation and transmission of resource coordination related signalling, to the gNBs 5-1, 5-2, for requesting protection of resources used for critical LTE transmissions.

The resource protection module 89 manages the blank/muting of resources 9 (e.g. by avoiding transmissions using those resources or by reducing the power of such transmissions), when the eNB 5-3 operates as a target or aggressor node, to protect critical transmissions of gNBs 5-1, 5-2 that operate as source or victim nodes.

Overview—Resource Coordination Methods

Figure 13A:
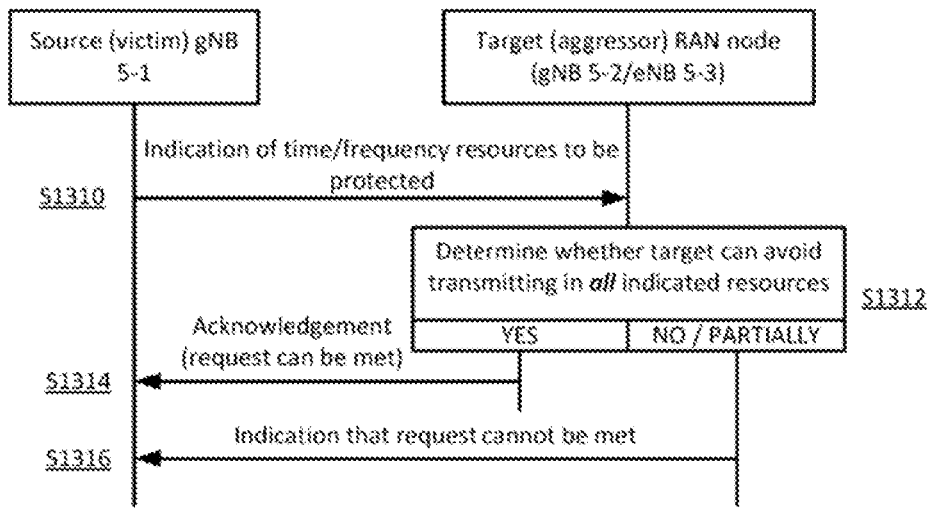
FIGS. 13(a)-13-(b) comprise simplified message sequence diagrams illustrating, in general terms, exemplary methods in which resources may be coordinated between nodes of the system of FIG. 4.
Figure 13B:
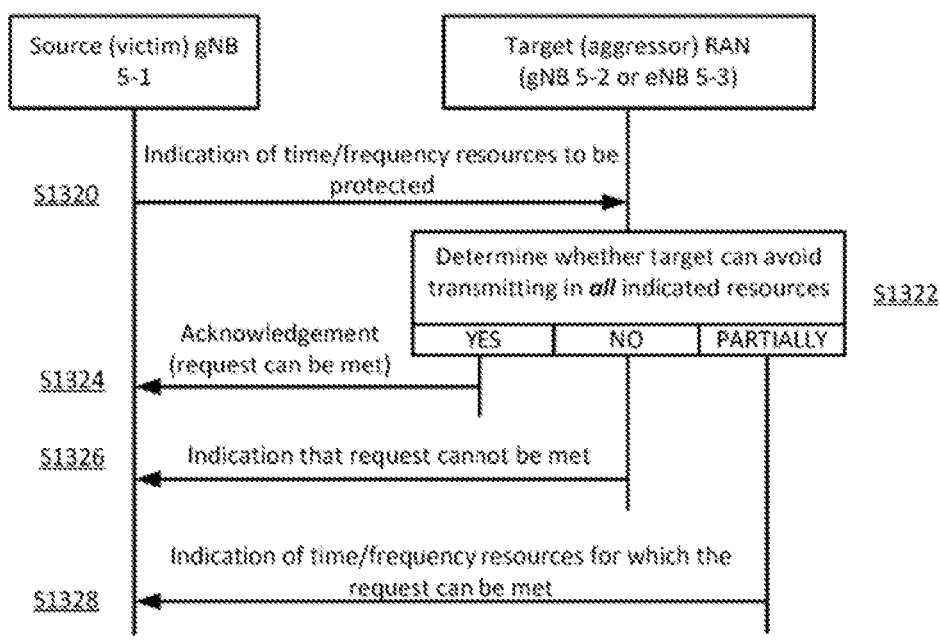

FIGS. 13(a) and 13(b) are simplified message sequence diagrams illustrating, in general terms, exemplary methods in which resources may be coordinated between nodes of the system of FIG. 4.

In FIG. 13(a) a source (victim) gNB 5-1 sends to a target (aggressor) RAN node (which may be a gNB 5-2 or an eNB 5-3), at S1310, a request indicating which time/frequency resources the requesting node will use for critical transmissions (e.g. transmissions of control information on a PDCCH, reference signals such as CSI-RS, or high priority data such as ultra-reliable low latency communications (URLLC)).

As described above, the description of time/frequency resources may take the form of: a list of parameters from which the receiving node can reconstruct the pattern of time/frequency resources; and/or one or more bitmaps indicating the time/frequency resources explicitly. Where the indication makes use of bitmap(s) the bitmap(s) may comprise a 'factored' bitmap consisting of a separate bitmap for time and bitmap for frequency. A more flexible approach (albeit at the expense of compactness), however, is to use a full two-dimensional bitmap with 1 bit for each resource in the time/frequency plane. The use of separate bitmaps such as this has the advantage that it is relatively compact albeit at the expense of flexibility (because it can only describe 'regular' patterns in the time/frequency plane).

The frequency granularity of the bitmap may be one PRB or one sub-carrier. The time granularity of the bitmap may be one OFDM symbol, one slot, or one sub-frame.

It will be appreciated that if the requesting node is an NR gNB that supports multiple numerologies or multiple bandwidth parts, it may include in the message(s) indicating the resources to be protected a separate time/frequency description for each of its supported numerologies or BWPs. Moreover, if the requesting node is aware of the configuration of the receiving node (e.g. numerologies, bandwidth part configurations etc.) then it may take this into account when deciding which time/frequency resources to include in its request. Since the frequency spectrum used by the receiving and requesting node may only partially overlap, the requesting node will typically include in the request message(s) sufficient information for the receiving node to calculate the overlapping frequency region (e.g. information identifying 'reference point A').

It will be appreciated that the requesting node may transmit the request message(s) to more than one receiving node (e.g. to a plurality of neighbour base stations/cells) and a receiving node may receive request messages from more than one requesting node (e.g. from a plurality of neighbour base stations/cells)

The target node 5-2, 5-3 determines, at S1312, whether or not it can avoid transmitting in the time/frequency resources indicated by the requesting node.

If the target node 5-2, 5-3 determines that it can avoid transmitting in the time/frequency resources indicated by the requesting node then it sends, at S1314, an acknowledgement confirming that it will avoid transmitting in the time/frequency resources indicated by the requesting node.

If the target node 5-2, 5-3 determines that it cannot, or (in this example) can only partially, avoid transmitting in the time/frequency resources indicated by the requesting node then it sends, at S1316, an indication that the request cannot be met.

In a variation of this method shown FIG. 13(b) a source (victim) gNB 5-1 sends to a target (aggressor) RAN node (which may be a gNB 5-2 or an eNB 5-3), at S1320, a request indicating which time/frequency resources the requesting node will use for critical transmissions (e.g. transmissions of control information on a PDCCH, reference signals such as CSI-RS, or high priority data such as ultra-reliable low latency communications (URLLC)).

As in FIG. 13(a) the target node 5-2, 5-3 determines, at S1322, whether or not it can avoid transmitting in the time/frequency resources indicated by the requesting node.

If the target node 5-2, 5-3 determines that it can avoid transmitting in the time/frequency resources indicated by the requesting node then it sends, at S1324, an acknowledgement confirming that it will avoid transmitting in the time/frequency resources indicated by the requesting node.

If the target node 5-2, 5-3 determines that it cannot avoid transmitting in the time/frequency resources indicated by the requesting node then it sends, at S1326, an indication that the request cannot be met.

Unlike the method of FIG. 13(a) however, if the target node 5-2, 5-3 determines that it can partially avoid transmitting in the time/frequency resources indicated by the requesting node then it sends, at S1328, an indication of the time/frequency resources for which the request can be met (e.g. using the format used to indicate the resources to be protected).

Exemplary Resource Coordination Method 1

Indicated resources are for non-priority service and at least some of the resources are in use at target for non-critical transmissions.

Figure 14:
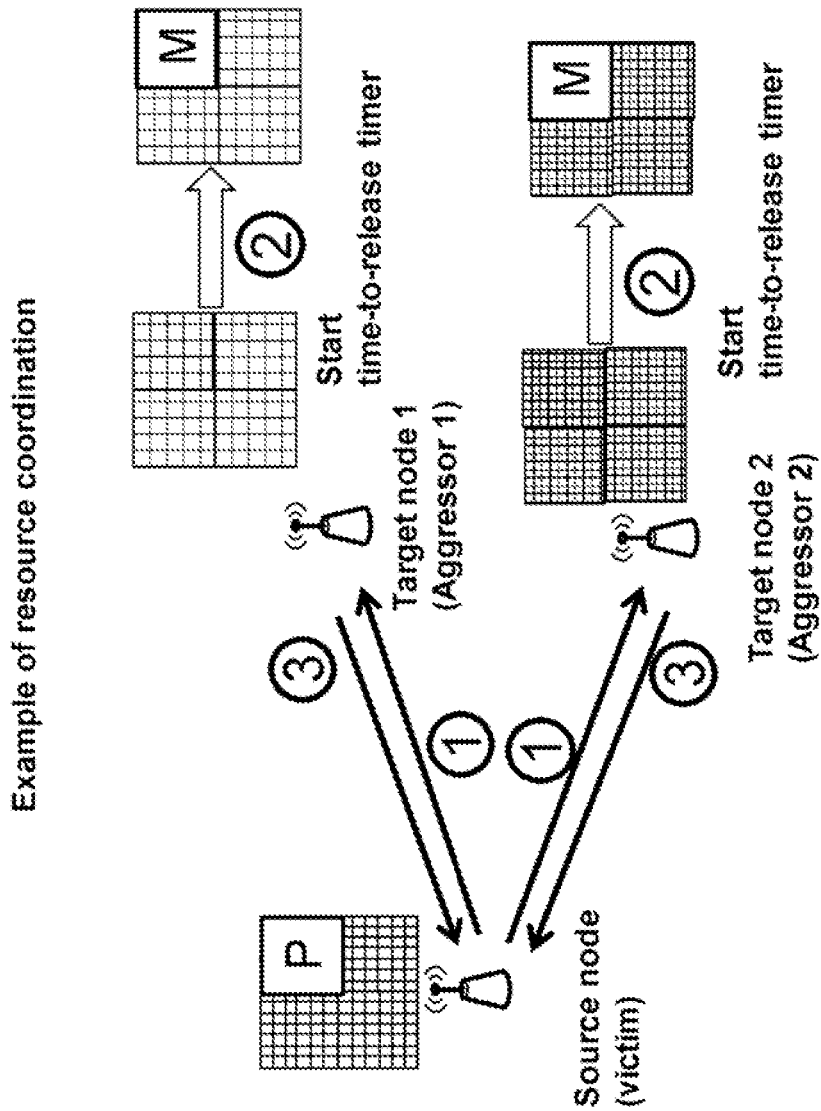
FIG. 14 is a diagram illustrating, in overview, an exemplary method in which resources may be coordinated between nodes of the system of FIG. 4.
Figure 15:
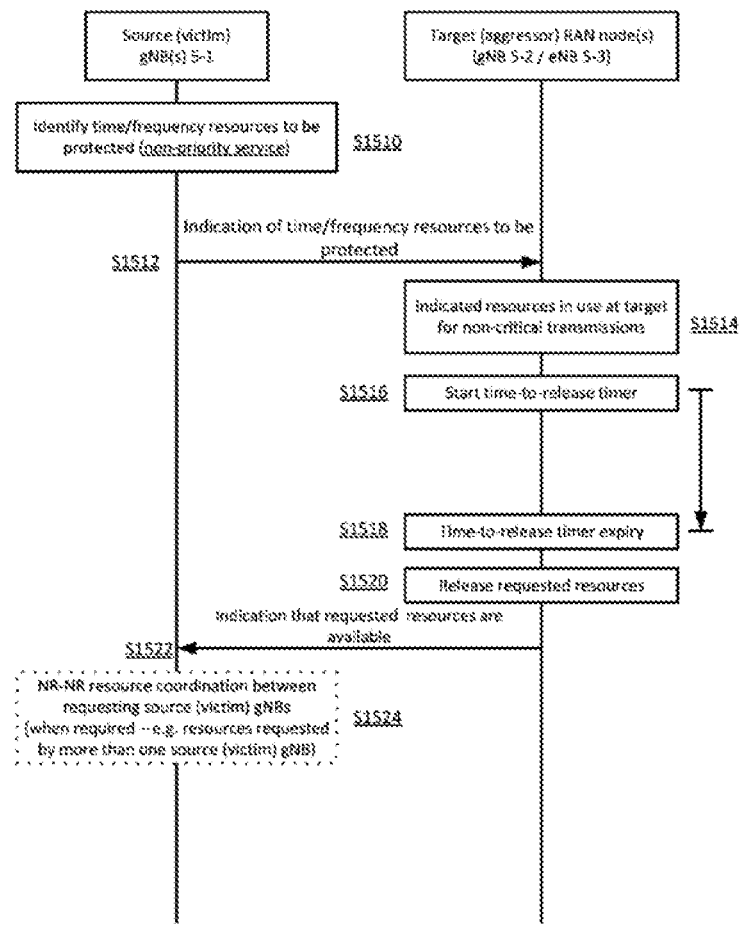
FIG. 15 is a simplified message sequence diagram illustrating, in more detail, the exemplary method of FIG. 14 in which resources may be coordinated between nodes of the system of FIG. 4.

FIG. 14 and FIG. 15 illustrate a specific exemplary method in which resources an exemplary method in which resources may be coordinated between nodes of the system of FIG. 4. In this exemplary method, whilst the indicated resources requiring protection are required for critical transmissions at the source node, they are for a non-priority service. However, whilst the indicated resources are not already in use for critical transmissions by the target node, at least some of the resources are in use at target for non-critical transmissions.

Referring to FIG. 14, which illustrates the specific exemplary method in overview, the specific exemplary method comprises three key steps. In step (1) the source node (victim) indicates the desired resources to be protected (P) at two neighbour target (aggressor) nodes 1 and 2. In step (2) if the desired resources are already in use (but not for critical transmissions) by the target neighbour node(s), then each target node will start a respective time-to-release timer. At step (3) following the expiry of the timers, the target node(s) indicate to the source node that the desired resources are available for access (i.e. blanked/muted (M)).

Should more than one source node request protection of the same resources, then after the expiry of the time-to-release timer, at the target node(s), the source nodes may bid for the released resources in a random way with equal access probability. For example, when the target node releases the resources after the expiry of the time-to-release timer, the interested source nodes access the released resources on a first come-first access basis. The use of a random resource access beneficially provides a level of collision avoidance when accessing the released resources should more than one source node request protection of the same resources at the target node. Referring to FIG. 15, this is a simplified message sequence diagram illustrating the exemplary method of FIG. 14 in more detail for the communication between the source node(s) (e.g. gNB 5-1) and target node(s) (e.g. gNB 5-2 or eNB 5-3).

As seen in FIG. 15, at S1510 the source gNB 5-1 identifies time/frequency resources to be protected for a non-priority service. The source gNB 5-1 provides, S1512, an indication of the time/frequency resources to be protected to the target RAN node(s). The target RAN node(s) determines, at S1514 that the indicated resources are in use at the target for non-critical transmissions and starts a time-to-release timer associated with the indicated resources at S1516. Any new resource indication request that arrives at the target node(s) during the time-to-release timer is rejected. On expiry, at S1518, of the time-to-release timer the target RAN node(s) release the requested resources at S1520 (possibly after moving any affected UEs to other resources) and sends, at S1522, an indication that the requested resources are available.

At S1524, if the same resources have been requested be a plurality of source gNBs, the requesting source nodes engage in a resource coordination procedure in which they bid for the resources in a random way with equal access probability. When one of the source nodes gains access to the requested resources it sends an indication, to each of the other source nodes that requested those resources, to start a corresponding "time-to-release" timer. After the expiry of this time-to-release timer any of the other nodes still interested in those resources can commence a resource coordination procedure by indicating, to neighbouring nodes interest in the desired resources (e.g. as generally described with reference to FIGS. 13(a)-13(b) or in accordance with any of the other resource coordination procedures described herein).

Exemplary Resource Coordination Method 2

Indicated resources are for non-priority service and at least some of the resources are in use at target for non-critical transmissions but cannot be released.

Figure 16:
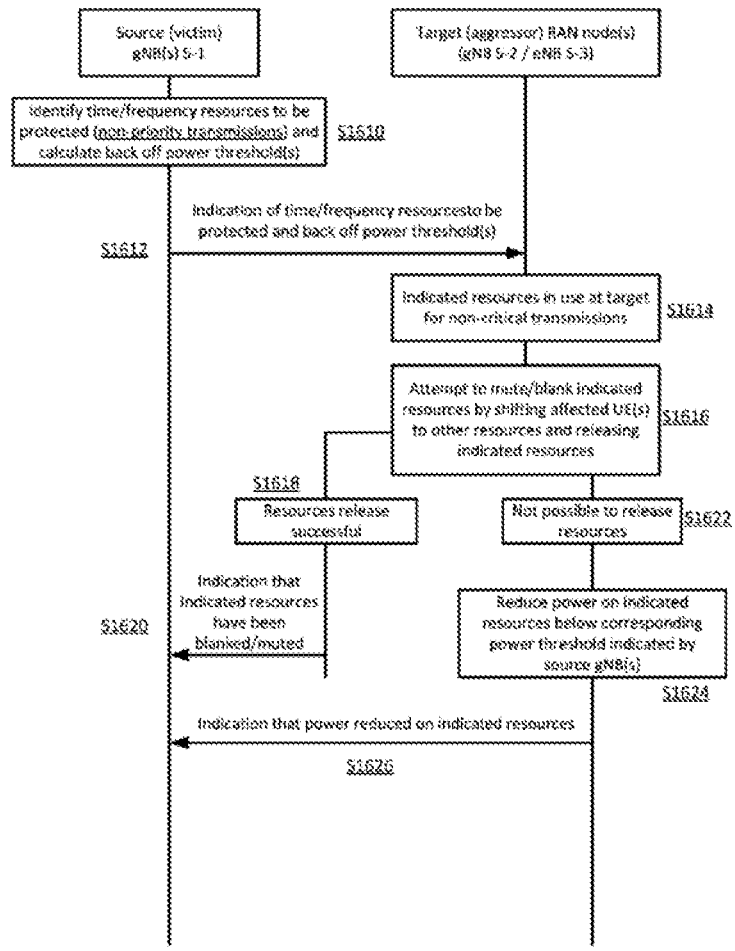
FIG. 16 is a simplified message sequence diagram illustrating another exemplary method in which resources may be coordinated between nodes of the system of FIG. 4.

FIG. 16 is a simplified message sequence diagram illustrating another exemplary method. In this exemplary method, whilst the indicated resources requiring protection are required for critical transmissions at the source node, they are for a non-priority service. As in FIG. 15, whilst the indicated resources are not already in use for critical transmissions by the target node, at least some of the resources are in use at target for non-critical transmissions. However, in this example, at least some of the resources cannot be released.

As seen in FIG. 16, at S1610 the source gNB 5-1 identifies time/frequency resources to be protected for a non-priority service. In this example, the source gNB 5-1 also calculates one or more back off power thresholds (or power allocation threshold(s)). The back off power threshold(s) represent a calculated transmission power below which any transmissions on the indicated resources by the target RAN node will cause no (or acceptable) interference to critical transmissions in those resources by the source gNB 5-1. The calculation of the power threshold(s) may, for example, be based on the nominal power allocated to the PRBs in a shared BWP at the source node and measurement of interference received at the desired PRBs from neighbouring target nodes using those PRBs.

The source gNB 5-1 provides, S1612, an indication of the time/frequency resources to be protected to the target RAN node(s) and the calculated power threshold(s). The target RAN node(s) determines, at S1614 that the indicated resources are in use at the target for non-critical transmissions and attempts to mute/blank the indicated resources at S1616 (e.g. by shifting affected UEs to new resources and releasing the indicated resources—possibly after expiry of a release timer as described with reference to FIG. 15). If the release is successful as indicated at S1618 the target RAN node(s) sends, at S1620, an indication that the requested resources are available.

If the release is not possible, as indicated at S1622, the target RAN node(s) decides to reduce transmission power for the indicated resources. The target RAN node(s) reduce, at S1624, the power allocated to the indicated resources below the corresponding power threshold that was provided by the source gNB 5-1 and sends, at S1626, an indication that the power has been reduced on the requested resources.

It will be appreciated that whilst the power threshold(s) are described as being calculated at S1610 (when the resources to be protected are identified) and sent to the target RAN node(s) at S1612 together with the indication of time frequency resources to be protected the power threshold(s) may be sent separately. For example, the power threshold(s) may be sent as part of separate resource coordination signalling between the source and target nodes at another time.

It will also be appreciated that in a simplified method, compared to those shown in and described with reference to FIGS. 15 and 16 the target RAN node(s) may, after receiving an indication of resources to be protected, simply release the desired resources after shifting any existing UEs (on those resources) to other available resources (e.g. without using an expiry timer). The target RAN node(s) can then indicate muting/blanking the desired resources to the source node(s) as described above.

Exemplary Resource Coordination Method 3

Indicated resources are for priority service.

Figure 17:
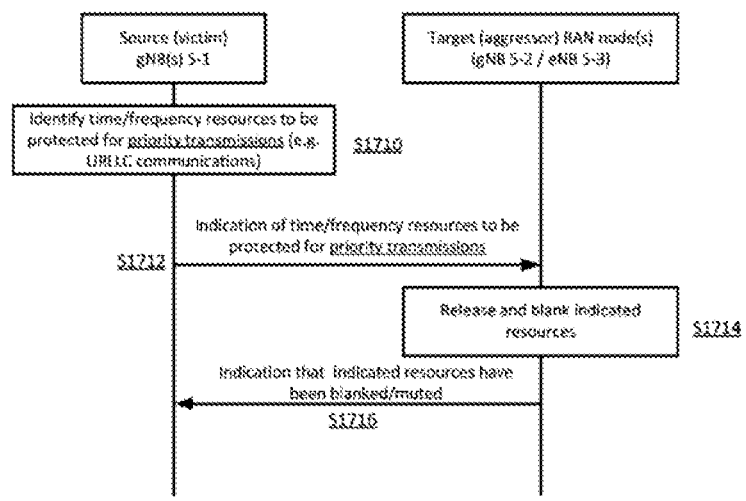
FIG. 17 is a simplified message sequence diagram illustrating another exemplary method in which resources may be coordinated between nodes of the system of FIG. 4.

FIG. 17 is a simplified message sequence diagram illustrating another exemplary method. In this exemplary method, the indicated resources requiring protection are for a priority service such as resources for supporting a request for a UE requiring a URLLC service.

As seen in FIG. 17, at S1710 the source gNB 5-1 identifies time/frequency resources to be protected for a priority service. The source gNB 5-1 provides, S1712, an indication of the time/frequency resources to be protected to the target RAN node(s) together with an indication that the service is a priority service. The target RAN node(s) determines, at S1714 that the indicated resources are for a priority service and mutes/blanks the indicated resources (e.g. regardless of whether those resources are already in use for non-critical transmissions and without waiting for expiry of a timer or the successful release of resources following shifting of affected UEs to other resources). At S1710, an indication that the requested resources are available is sent to the source gNB 5-1.

Exemplary Resource Coordination Signalling Implementations

FIGS. 18 to 20 illustrate a number of different specific signalling implementations for providing resource coordination information from a source RAN node to a target RAN node. It will be appreciated that a working system may implement any one or combination these implementations.
Protected NR Resource Indication IE In each of the implementations illustrated in FIGS. 18 to 20 a new dedicated information element (referred to as a 'Protected NR Resource Indication IE' or 'Protected NR Resource IE') is included in specific messages for providing an indication of the resources to be protected to the recipient(s) of the message. The Protected NR Resource Indication IE typically comprises different information elements for NR-NR resource coordination as compared to NR-LTE resource communication.

Table 1, for example summarises an example of the information elements that may be included in the Protected NR Resource Indication IE for NR-LTE resource coordination. As seen in Table 1, the Protected NR Resource Indication IE for NR-LTE resource coordination comprises an NR Cell ID (for the source gNB 5-1), an E-UTRA Cell ID (for the target eNB 5-3), the SCS, the BWP size, a combined bitmap (frequency and time), a reference point (for the indicated BWP), and (optionally) a service priority.

TABLE 1

Table 1—Exemplary gNB to eNB coordination IE

| IE/Group Name | Presence | Range | IE Type and Reference | Semantics Description |
|---|---|---|---|---|
| gNB | | | | |
| NR Cell ID | M | | | |
| eNB | | | | |
| EUTRA Cell ID | M | | | |
| SCS | M | | ENUMERATED (15 kHz, 30 kHz, 60 kHz, 120 kHz, 240 kHz) | This IE is used to indicate subcarrier spacing from source gNB to Target gNB. |
| Bandwidth part (BWP) size | M | — | ENUMERATED (...) | This IE is used to indicate the size of the bandwidth part (BWP) in which NR resources are allocated. |
| Combined Coordination bitmaps | M | — | ... | This combined bitmap of REs occupied by the allocated resources within one PRB. Each position in the bitmap represents an RE in one PRB; value "0" indicates "resource not allocated", value "1" indicates "resource allocated". One combined bitmap per BWP. |
| Reference Point | M | | | This IE is used by the gNB to calculate the start of the bitmap in the frequency domain. |
| Service Priority | O | | | This IE is used by the gNB to Indicate a priority of a service. |

Table 2, for example summarises an example of the information elements that may be included in the Protected NR Resource Indication IE for NR-NR resource coordination. As seen in Table 2, the Protected NR Resource Indication IE for NR-NR resource coordination comprises NR Cell IDs (for the source and target gNBs), the SCS, the BWP size, combined bitmaps (frequency and time), a reference point (for the indicated BWP), (optionally) a service priority, and (optionally) a power threshold.

TABLE 2

Table 2—Exemplary gNB to gNB coordination IE

| IE/Group Name | Presence | Range | IE Type and Reference | Semantics Description |
|---|---|---|---|---|
| Source gNB | | | | |
| NR Cell ID | M | | | |
| Target gNB | | | | |
| NR Cell ID | M | | | |
| SCS | M | | ENUMERATED (15 kHz, 30 kHz, 60 kHz, 120 kHz, 240 kHz) | This IE is used to indicate subcarrier spacing from source gNB to Target gNB. |
| Bandwidth part (BWP) size | M | — | ENUMERATED (BWP1, BWP2, etc.) | This IE is used to indicate the size of the bandwidth part (BWP) in which NR resources are allocated. |
| Combined Coordination bitmaps/super bit map | M | — | . . . | The combined bitmap of REs occupied by the allocated resources within one PRB. Each position in the bitmap represents an RE in one PRB: value "0" indicates "resource not allocated", value "1" indicates "resource allocated". One combined bitmap per BWP. The super bitmap can be used with the minimum frequency granularity (i.e. PRB/SCS = 15 KHz)) and minimum time granularity (i.e. symbol granularity (e.g, SCS-60 KHz)). |
| Reference Point | M | | | This IE is used by the gNB to calculate the start of the bitmap in the frequency domain. |
| Service Priority | O | | | This IE is used by the gNB to indicate a priority of a service. |
| Power Threshold | O | | ENUMERATED (Pow_Th1, Pow_Th2, Pow_Th3 . . . etc.) | This IE is used by the target gNB in order to reduce allocated power to PRBs indicated in the combined coordination bitmaps as "1". |

It will be appreciated that whilst the specific IE, comprising the specific information elements is described this information need not be provided in a single information element or even a single message. It will also be appreciated that the purpose of some of the IEs may be achieved by providing different information. For example, whilst an SCS IE is described for identifying a specific SCS, a different IE may be used from which the SCS may be determined (e.g. a numerology identifier or the like). Similarly the Cell IDs may comprise any suitable base station or cell identification IE.

NR-NR (Xn) Coordination Procedure

Figure 18A:
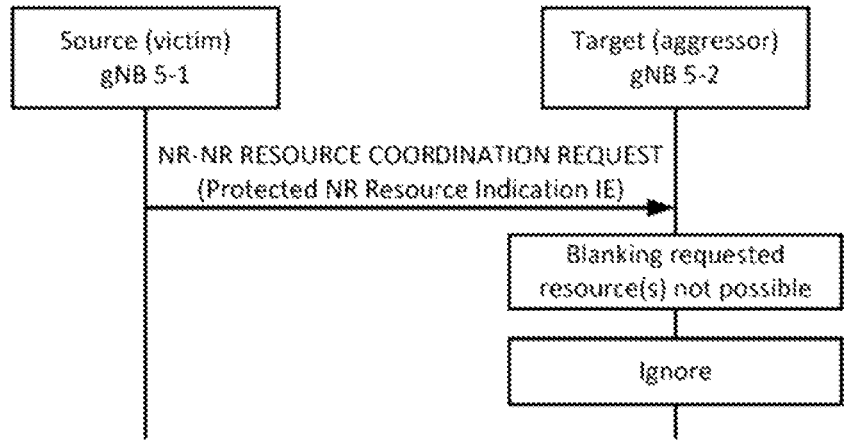
FIGS. 18(a)-18(c) illustrate different specific signalling implementations for providing resource coordination information from a source RAN node to a target RAN node.
Figure 18B:
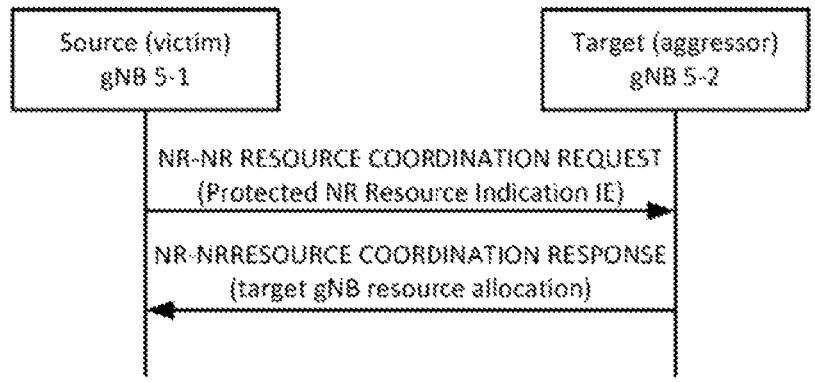
Figure 18C:
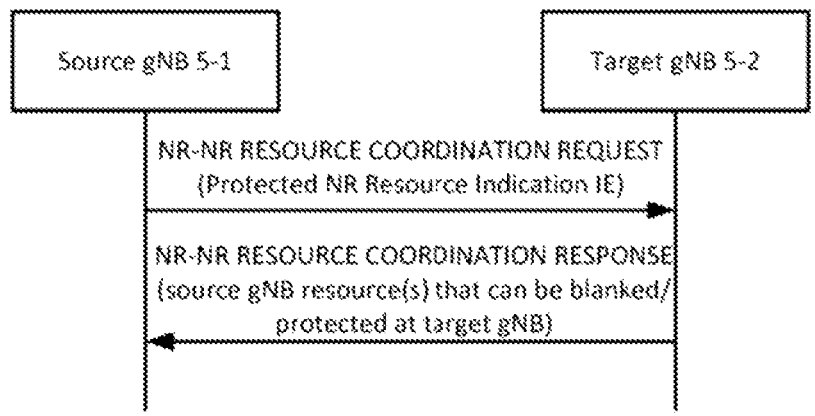

FIGS. 18(a) to (c) comprises three signalling diagrams illustrating exemplary variations of an implementation in which dedicated NR-NR resource coordination signalling is used in a dedicated NR-NR coordination procedure. In the examples of FIGS. 18(a)-18(c) the source and target nodes are NR RAN nodes (gNBs) that share the same spectrum (with a full or partial overlap).

As seen in each of the signalling variations shown in FIGS. 18,(a)-18(c) the source gNB initiates the NR-NR resource coordination procedure, over the direct (Xn) interface between the gNBs by sending an NR-NR (Xn) RESOURCE COORDINATION REQUEST message to the target gNB 5-2 to request protection of resources that are required for critical transmissions at the source gNB 5-1. The resources are indicated by means of the Protected NR Resource Indication IE included in the RESOURCE COORDINATION REQUEST message.

In the variation shown in FIG. 18(a), the target gNB determines that the requested protection is not possible for the indicated resources and ignores the request. Alternatively, the target gNB may reply by sending an NR-NR (Xn) RESOURCE COORDINATION RESPONSE (or similar) message to indicate that the request cannot be fulfilled.

In the variation shown in FIG. 18(b), the target gNB 5-2 replies by sending an NR-NR (Xn) RESOURCE COORDINATION RESPONSE (or similar) message to indicate the target gNB's own resource allocation (e.g. using the Protected NR Resource Indication IE format or similar) to allow the both source gNB 5-1 and target gNB-2 to coordinate resource usage to avoid interference on resources used by the other gNB.

In the variation shown in FIG. 18(c), the target gNB 5-2 replies by sending an NR-NR (Xn) RESOURCE COORDINATION RESPONSE (or similar) message to indicate to the source gNB 5-1 which of the indicated resources the target gNB 5-2 is able to protect (blank/mute), for example, when only partial blanking is possible (e.g. only subset of the resources requested by the source gNB 5-1 can be protected).

Other NR-NR (Xn) Procedures

Figure 19A:
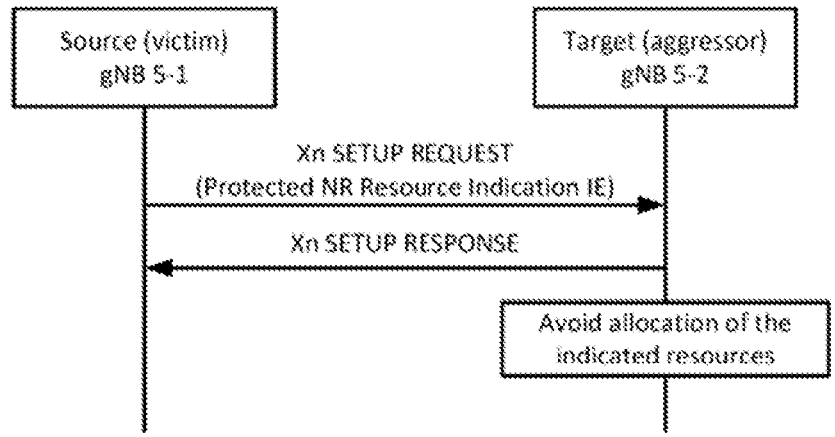
FIGS. 19(a)-19(b) illustrate different specific signalling implementations for providing resource coordination information from a source RAN node to a target RAN node.

FIGS. 19(a) and (b) each comprise a signalling diagram illustrating another exemplary implementation in which an existing NR-NR signalling procedure is adapted to provide resource coordination information (e.g. over an Xn interface).

In FIG. 19(a) the Xn Setup Procedure is adapted by including the corresponding Protected NR Resource Indication IE as part of the Xn SETUP REQUEST message sent from the source gNB 5-1 to the target gNB 5-2. As a result of receiving the Xn SETUP REQUEST message including the Protected NR Resource Indication IE the target gNB 5-2 is beneficially able to avoid allocation of the resources indicated by the Protected NR Resource Indication IE.

Figure 19B:
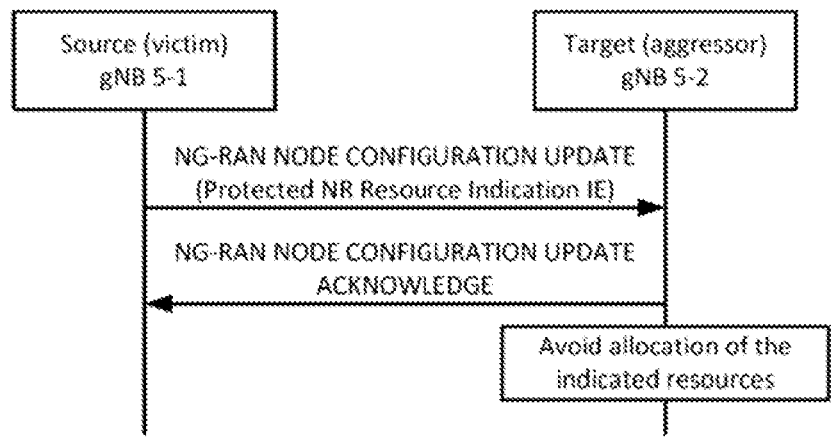

In FIG. 19(b) the NG-RAN Node Configuration Update procedure is adapted by including the corresponding Protected NR Resource Indication IE as part of the NG-RAN CONFIGURATION UPDATE message sent from the source gNB 5-1 to the target gNB 5-2. As a result of receiving the NG-RAN CONFIGURATION UPDATE message including the Protected NR Resource Indication IE the target gNB 5-2 is beneficially able to avoid allocation of the resources indicated by the Protected NR Resource Indication IE. It will be appreciated that the Protected NR Resource Indication IE may be provided from a source gNB 5-1 to a target gNB 5-2 during a NG-RAN Node Configuration Update procedure, initiated by the target gNB, in an NG-RAN CONFIGURATION UPDATE ACKNOWLEDGE message.

NR-LTE dual connectivity (E-UTRA-NR dual connectivity (EN-DC)) Procedures

Figure 20A:
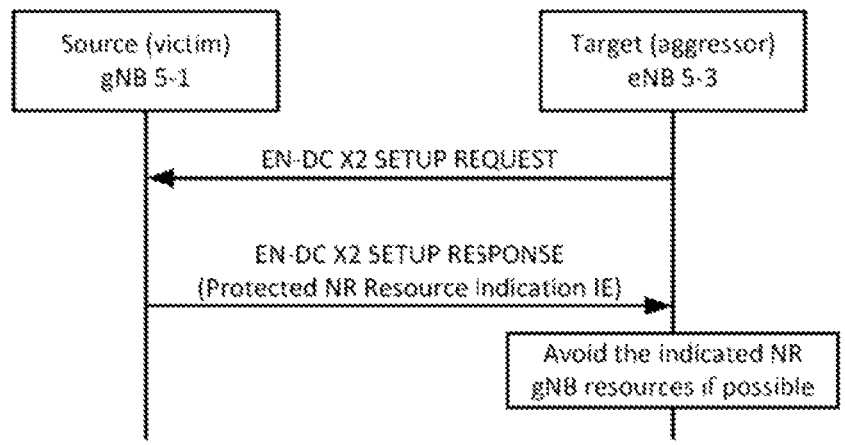
FIGS. 20(a)-20(c) illustrate different specific signalling implementations for providing resource coordination information from a source RAN node to a target RAN node.
Figure 20B:
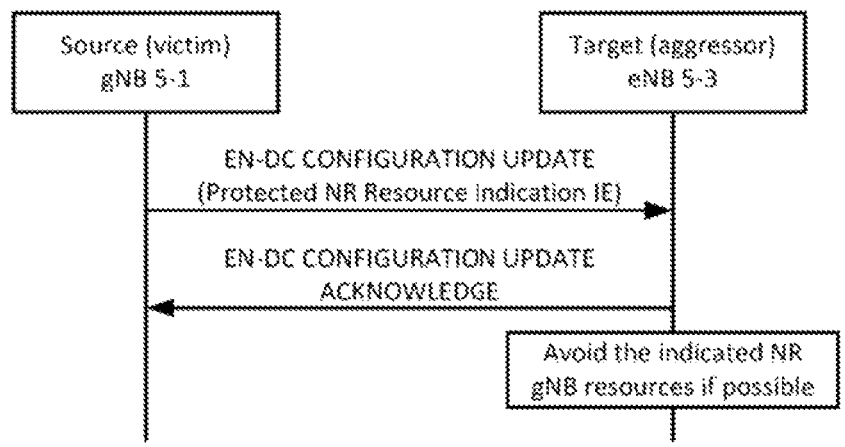
Figure 20C:
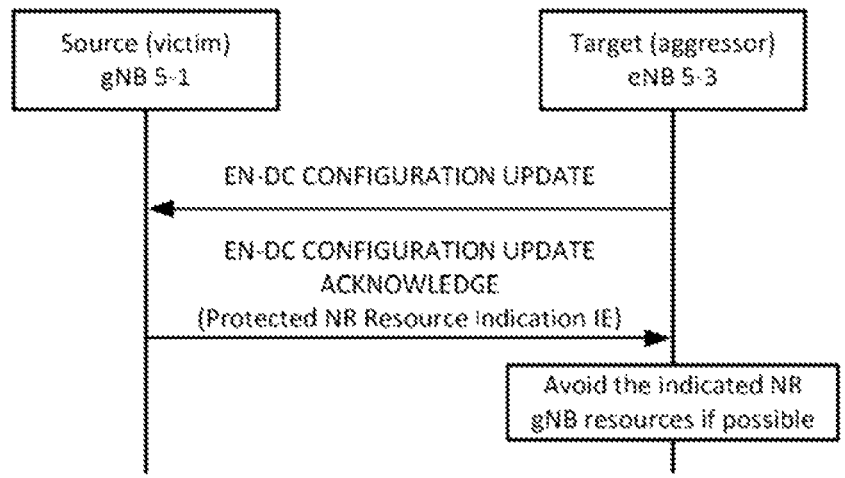

FIGS. 20(a) to (c) each comprise a signalling diagram illustrating exemplary signalling implementations in which an existing NR-LTE dual connectivity signalling procedure (e.g. over an X2 interface) is adapted to provide resource coordination information between a gNB and an eNB operating in a dual connectivity deployment.

In FIG. 20(a) the EN-DC X2 Setup Procedure is adapted by including the corresponding Protected NR Resource Indication IE as part of the EN-DC X2 SETUP RESPONSE message sent from the (source) gNB 5-1 to the (target) eNB 5-3 in response to an EN-DC X2 SETUP REQUEST message from the eNB 5-3. As a result of receiving the EN-DC X2 SETUP RESPONSE message including the Protected NR Resource Indication IE the target eNB 5-3 is beneficially able to avoid allocation of the resources indicated by the Protected NR Resource Indication IE.

In FIG. 20(b) the EN-DC Configuration Update procedure is adapted by including the corresponding Protected NR Resource Indication IE as part of the EN-DC CONFIGURATION UPDATE message sent from the (source) gNB 5-1 to the (target) eNB 5-3 to initiate the EN-DC Configuration Update procedure. As a result of receiving the EN-DC CONFIGURATION UPDATE message including the Protected NR Resource Indication IE the target eNB 5-3 is beneficially able to avoid allocation of the resources indicated by the Protected NR Resource Indication IE.

In FIG. 20(c) the EN-DC Configuration Update procedure is adapted by including the corresponding Protected NR Resource Indication IE as part of the EN-DC CONFIGURATION UPDATE ACKNOWLEDGE message sent from the (source) gNB 5-1 to the target eNB 5-3 when the target eNB 5-3 initiates the EN-DC Configuration Update procedure (i.e. by sending the EN-DC CONFIGURATION UPDATE message). As a result of receiving the EN-DC CONFIGURATION UPDATE ACKNOWLEDGE message including the Protected NR Resource Indication IE the target eNB 5-3 is beneficially able to avoid allocation of the resources indicated by the Protected NR Resource Indication IE.

Modifications and Alternatives

Detailed example embodiments have been described above. As those skilled in the art will appreciate, a number of modifications and alternatives can be made to the above example embodiments whilst still benefiting from the inventions embodied therein. By way of illustration only a number of these alternatives and modifications will now be described.

In the above example embodiments, a number of software modules were described. As those skilled in the art will appreciate, the software modules may be provided in compiled or un-compiled form and may be supplied to the apparatus in question (UE, RAN, eNB, gNB etc.) as a signal over a computer network, or on a recording medium. Further, the functionality performed by part or all of this software may be performed using one or more dedicated hardware circuits. However, the use of software modules is preferred as it facilitates the updating of the base station or the mobile device in order to update their functionalities.

Each controller forming part of an apparatus described herein may comprise any suitable form of processing circuitry including (but not limited to), for example: one or more hardware implemented computer processors; microprocessors; central processing units (CPUs); arithmetic logic units (ALUs); input/output (IO) circuits; internal memories/caches (program and/or data); processing registers; communication buses (e.g. control, data and/or address buses); direct memory access (DMA) functions; hardware or software implemented counters, pointers and/or timers; and/or the like.

Various other modifications will be apparent to those skilled in the art and will not be described in further detail here.

SUMMARY

In one example described above there is disclosed a method performed by a first radio access network (RAN) node configured to operate in accordance with next generation (5G/NR) standards, the method comprising: identifying resources, that the first radio access network (RAN) node is to use for transmissions, for protection from interference from at least one further RAN node; and sending, to the at least one further RAN node, information indicating the identified resources for protection from interference, wherein the information indicating the identified resources comprises a list of parameters based on which the at least one further RAN node is able to determine the resources for protection from interference.

The information indicating the identified resources may comprise at least one bitmap for explicitly indicating the identified resources. The at least one bitmap may be configured for explicitly indicating identified frequency resources and for explicitly indicating time resources. The at least one bitmap may comprise at least one bitmap configured for explicitly indicating frequency resources and at least one separate bitmap configured for explicitly indicating time resources. The at least one bitmap may comprise at least one two-dimensional bitmap for indicating both frequency and time resources. The at least one bitmap may have a frequency granularity of one physical resource block (PRB) or one subcarrier associated with a given numerology corresponding to a specific subcarrier spacing (SCS). The at least one bitmap may have a time granularity of one symbol, one slot, or one subframe associated with a given numerology corresponding to a specific slot length. The at least one bitmap may have a minimum frequency granularity associated with a first numerology corresponding to a first specific subcarrier spacing (SCS) and slot length, and wherein the at least one bitmap has a minimum time granularity associated with a second numerology, corresponding to a second SCS and slot length, that is different to the first numerology.

The list of parameters may comprise information identifying at least one of: a cell or base station identifier for the first RAN node; a cell or base station identifier for the at least one further RAN node; an identifier of a subcarrier spacing (or other numerology identifier); an identifier of a bandwidth part size; a frequency reference point (e.g. 'reference point A'); a service priority associated with transmission in the identified resources; and a power threshold.

The information indicating the identified resources may be provided as part of a dedicated information element. The information indicating the identified resources may be provided as part of a dedicated NR-NR information element when the information is being sent to another RAN node configured to operate in accordance with next generation (5G/NR) standards and/or wherein the information indicating the identified resources is provided as part of a dedicated NR-LTE information element when the information is being sent to a RAN node configured to operate in accordance with LTE standards.

The at least one further RAN node may comprise at least one further RAN node configured to operate in accordance with next generation (5G/NR) standards. The information indicating the identified resources may be provided to the at least one further RAN node configured to operate in accordance with next generation (5G/NR) standards as part of at least one of the following procedures: a dedicated NR-NR (Xn) coordination procedure; an Xn setup procedure (e.g. in an Xn SETUP REQUEST message); and an NG-RAN node configuration update procedure (e.g. in an NG-RAN CONFIGURATION UPDATE message or an NG-RAN CONFIGURATION UPDATE ACKNOWLEDGE message).

The at least one further RAN node may comprise at least one RAN node configured to operate in accordance with LTE standards. The information indicating the identified resources may be provided to the at least one RAN node configured to operate in accordance with LTE standards as part of at least one of the following procedures: an EN-DC X2 setup procedure (e.g. in an EN-DC X2 SETUP RESPONSE message); and an EN-DC configuration update procedure (e.g. in an EN-DC CONFIGURATION UPDATE message or an EN-DC CONFIGURATION UPDATE ACKNOWLEDGE message).

The first RAN node may be configured to support a plurality of different numerologies (subcarrier spacings/slot lengths) and/or a plurality of different bandwidth parts. The separate respective information indicating identified resources may be provided for each of the plurality of different numerologies and/or each of the plurality of different bandwidth parts.

When identifying resources for protection from interference from at least one further RAN node, the first RAN node may take into account a configuration of the at least one further RAN node (e.g. at least one of a numerology, a bandwidth part configuration). The first RAN node may transmit the information indicating identified resources to a plurality of RAN nodes (e.g. RAN nodes operating neighbouring cells). The identified resources to be protected may comprise resources that the first base station requires for at least one of critical transmissions; and supporting a priority service.

The method may further comprise receiving from at least one further RAN node an indication that the indicated resources have been released, wherein on receipt of the indication that the indicated resources have been released the first RAN node attempts to obtain access to the released resources, wherein when at least one competing RAN node attempts to obtain access to the same resources as the first RAN node, the first RAN node engages in an access procedure with the at least one competing RAN node in which each RAN node attempts to obtain access to the indicated resources in a manner in which each RAN node engaging in the procedure has substantially an equal probability of successfully accessing the indicated resources (e.g. a random/first come-first access procedure).

When the first RAN node successfully accesses the indicated resources as part of the access procedure, before at least one competing RAN node successfully accesses the indicated resources, the first RAN node may send to each competing RAN node that has not successfully accessed the resources a message to initiate the start of a respective timer on expiry of which that competing RAN node can attempt to access the indicated resources again.

In one example described above there is disclosed a method performed by a first radio access network (RAN) node, the method comprising: receiving, from at least one further RAN node information indicating resources for protection from interference from the first RAN node at the at least one further RAN node, wherein the at least one further RAN node is configured to operate in accordance with next generation (5G/NR) standards and wherein the information indicating the identified resources comprises a list of parameters based on which the first RAN node is able to determine the resources for protection from interference; and determining whether the indicated resources can be protected from interference from the first RAN node; wherein when the first RAN node determines that the indicated resources can be protected from interference from the first RAN node, the first RAN node configures its transmissions to protect the indicated resources and sends, to the at least one further RAN node, an indication that that the indicated resources can be protected.

The first RAN node may configure its transmissions to protect the indicated resources by configuring the transmissions in accordance with at least one of the following: to avoid transmission in at least some of the indicated resources; to release at least some of the indicated resources that are already in use at the first RAN node for transmission; to move transmissions in at least some of the indicated resources that are already in use for a given user equipment (UE) to other resources; and/or to reduce transmission power in at least some of the indicated resources that are already in use at the first RAN node for transmission.

The first RAN node may configure its transmissions to protect the indicated resources by starting a time-to-release timer, and by configuring the transmissions to release at least some of the indicated resources that are already in use at the first RAN node for transmission following expiry of the time-to-release timer, and wherein the indication that that the indicated resources can be protected indicates that the resources have been released.

When the first RAN node determines that some but not all of the indicated resources can be protected from interference from the first RAN node, the first RAN node may configure its transmissions to protect the indicated resources that can be protected and sends, to the at least one further RAN node, an indication that the indicated resources can be partially protected and information identifying the indicated resources that can be protected. The first RAN node may determine that the indicated resources cannot be protected from interference from the first RAN node, the first RAN node sends, to the at least one further RAN node, an indication that the indicated resources cannot be protected.

In one example described above there is disclosed a radio access network (RAN) node comprising: means for operating the RAN node in accordance with next generation (5G/NR) standards; means for identifying resources, that the radio access network (RAN) node is to use for transmissions, for protection from interference from at least one further RAN node; and means for controlling the transceiver to send, to the at least one further RAN node, information indicating the identified resources for protection from interference, wherein the information indicating the identified resources comprises a list of parameters based on which the at least one further RAN node is able to determine the resources for protection from interference.

In one example described above there is disclosed a radio access network (RAN) node comprising: means for receiving, from at least one further RAN node information indicating resources for protection from interference from said RAN node at the at least one further RAN node, wherein the at least one further RAN node is configured to operate in accordance with next generation (5G/NR) standards, and wherein the information indicating the identified resources comprises a list of parameters based on which said RAN node is able to determine the resources for protection from interference; means for determining whether the indicated resources can be protected from interference from said RAN node; means for controlling, when the means for determining determines that the indicated resources can be protected from interference from the first RAN node, transmissions from said transceiver to protect the indicated resources and to send, to the at least one further RAN node, an indication that that the indicated resources can be protected.

Some of or all the above-described example embodiments can be described as in the following Supplementary Notes, but are not limited to the following.

Supplementary Note 1

A method performed by a first radio access network (RAN) node configured to operate in accordance with next generation (5G/NR) standards, the method comprising: identifying resources, that the first radio access network (RAN) node is to use for transmissions, for protection from interference from at least one further RAN node; and sending, to the at least one further RAN node, information indicating the identified resources for protection from interference, wherein the information indicating the identified resources comprises a list of parameters based on which the at least one further RAN node is able to determine the resources for protection from interference.

Supplementary Note 2

A method as claimed in Supplementary Note 1 wherein the information indicating the identified resources comprises at least one bitmap for explicitly indicating the identified resources.

Supplementary Note 3

A method as claimed in Supplementary Note 2 wherein the at least one bitmap is configured for explicitly indicating identified frequency resources and for explicitly indicating time resources.

Supplementary Note 4

A method as claimed in Supplementary Note 3 wherein the at least one bitmap comprises at least one bitmap configured for explicitly indicating frequency resources and at least one separate bitmap configured for explicitly indicating time resources.

Supplementary Note 5

A method as claimed in Supplementary Note 3 wherein the at least one bitmap comprises at least one two-dimensional bitmap for indicating both frequency and time resources.

Supplementary Note 6

A method as claimed in any one of Supplementary Notes 3 to 5 wherein the at least one bitmap has a frequency granularity of one physical resource block (PRB) or one subcarrier associated with a given numerology corresponding to a specific subcarrier spacing (SCS).

Supplementary Note 7

A method as claimed in any one of Supplementary Notes 3 to 6 wherein the at least one bitmap has a time granularity of one symbol, one slot, or one subframe associated with a given numerology corresponding to a specific slot length.

Supplementary Note 8

A method as claimed in any one of Supplementary Notes 3 to 7 wherein the at least one bitmap has a minimum frequency granularity associated with a first numerology corresponding to a first specific subcarrier spacing (SCS) and slot length, and wherein the at least one bitmap has a minimum time granularity associated with a second numerology, corresponding to a second SCS and slot length, that is different to the first numerology.

Supplementary Note 9

A method as claimed in any one of Supplementary Notes 1 to 8 wherein the list of parameters comprises information identifying at least one of: a cell or base station identifier for the first RAN node; a cell or base station identifier for the at least one further RAN node; an identifier of a subcarrier spacing (or other numerology identifier); an identifier of a bandwidth part size; a frequency reference point (e.g. 'reference point A'); a service priority associated with transmission in the identified resources; and a power threshold.

Supplementary Note 10

A method as claimed in any one of Supplementary Notes 1 to 9 wherein the information indicating the identified resources is provided as part of a dedicated information element.

Supplementary Note 11

A method as claimed in Supplementary Note 10 wherein the information indicating the identified resources is provided as part of a dedicated NR-NR information element when the information is being sent to another RAN node configured to operate in accordance with next generation (5G/NR) standards and/or wherein the information indicating the identified resources is provided as part of a dedicated NR-LTE information element when the information is being sent to a RAN node configured to operate in accordance with LTE standards.

Supplementary Note 12

A method as claimed in any one of Supplementary Notes 1 to 11 wherein the at least one further RAN node comprises at least one further RAN node configured to operate in accordance with next generation (5G/NR) standards.

Supplementary Note 13

A method as claimed in Supplementary Note 12 wherein the information indicating the identified resources is provided to the at least one further RAN node configured to operate in accordance with next generation (5G/NR) standards as part of at least one of the following procedures: a dedicated NR-NR (Xn) coordination procedure; an Xn setup procedure (e.g. in an Xn SETUP REQUEST message); and an NG-RAN node configuration update procedure (e.g. in an NG-RAN CONFIGURATION UPDATE message or an NG-RAN CONFIGURATION UPDATE ACKNOWLEDGE message).

Supplementary Note 14

A method as claimed in any one of Supplementary Notes 1 to 13 wherein the at least one further RAN node comprises at least one RAN node configured to operate in accordance with LTE standards.

Supplementary Note 15

A method as claimed in Supplementary Note 14 wherein the information indicating the identified resources is provided to the at least one RAN node configured to operate in accordance with LTE standards as part of at least one of the following procedures: an EN-DC X2 setup procedure (e.g. in an EN-DC X2 SETUP RESPONSE message); and an EN-DC configuration update procedure (e.g. in an EN-DC CONFIGURATION UPDATE message or an EN-DC CONFIGURATION UPDATE ACKNOWLEDGE message).

Supplementary Note 16

A method as claimed in any one of Supplementary Notes 1 to 15 wherein the first RAN node is configured to support a plurality of different numerologies (subcarrier spacings/slot lengths) and/or a plurality of different bandwidth parts.

Supplementary Note 17

A method as claimed in Supplementary Note 16 wherein separate respective information indicating identified resources is provided for each of the plurality of different numerologies and/or each of the plurality of different bandwidth parts.

(Supplementary Note 18

A method as claimed in any one of Supplementary Notes 1 to 17 wherein, when identifying resources for protection from interference from at least one further RAN node, the first RAN node takes into account a configuration of the at least one further RAN node (e.g. at least one of a numerology, a bandwidth part configuration).

Supplementary Note 19

A method as claimed in any one of Supplementary Notes 1 to 18 wherein the first RAN node transmits the information indicating identified resources to a plurality of RAN nodes (e.g. RAN nodes operating neighbouring cells).

Supplementary Note 20

A method as claimed in any one of Supplementary Notes 1 to 19 wherein the identified resources to be protected comprise resources that the first base station requires for at least one of critical transmissions; and supporting a priority service.

Supplementary Note 21

A method as claimed in any one of Supplementary Notes 1 to 20 further comprising receiving from at least one further RAN node an indication that the indicated resources have been released, wherein on receipt of the indication that the indicated resources have been released the first RAN node attempts to obtain access to the released resources, wherein when at least one competing RAN node attempts to obtain access to the same resources as the first RAN node, the first RAN node engages in an access procedure with the at least one competing RAN node in which each RAN node attempts to obtain access to the indicated resources in a manner in which each RAN node engaging in the procedure has substantially an equal probability of successfully accessing the indicated resources (e.g. a random/first come-first access procedure).

Supplementary Note 22

A method as claimed in Supplementary Note 21 wherein, when the first RAN node successfully accesses the indicated resources as part of the access procedure, before at least one competing RAN node successfully accesses the indicated resources, the first RAN node sends to each competing RAN node that has not successfully accessed the resources a message to initiate the start of a respective timer on expiry of which that competing RAN node can attempt to access the indicated resources again.

Supplementary Note 23

A method performed by a first radio access network (RAN) node, the method comprising: receiving, from at least one further RAN node information indicating resources for protection from interference from the first RAN node at the at least one further RAN node, wherein the at least one further RAN node is configured to operate in accordance with next generation (5G/NR) standards and wherein the information indicating the identified resources comprises a list of parameters based on which the first RAN node is able to determine the resources for protection from interference; and determining whether the indicated resources can be protected from interference from the first RAN node; wherein when the first RAN node determines that the indicated resources can be protected from interference from the first RAN node, the first RAN node configures its transmissions to protect the indicated resources and sends, to the at least one further RAN node, an indication that that the indicated resources can be protected.

Supplementary Note 24

A method as claimed in Supplementary Note 23 wherein the first RAN node configures its transmissions to protect the indicated resources by configuring the transmissions in accordance with at least one of the following: to avoid transmission in at least some of the indicated resources; to release at least some of the indicated resources that are already in use at the first RAN node for transmission; to move transmissions in at least some of the indicated resources that are already in use for a given user equipment (UE) to other resources; and/or to reduce transmission power in at least some of the indicated resources that are already in use at the first RAN node for transmission.

Supplementary Note 25

A method as claimed in Supplementary Note 23 or 24 wherein the first RAN node configures its transmissions to protect the indicated resources by starting a time-to-release timer, and by configuring the transmissions to release at least some of the indicated resources that are already in use at the first RAN node for transmission following expiry of the time-to-release timer, and wherein the indication that that the indicated resources can be protected indicates that the resources have been released.

Supplementary Note 26

A method as claimed in any one of Supplementary Notes 23 to 25 wherein when the first RAN node determines that some but not all of the indicated resources can be protected from interference from the first RAN node, the first RAN node configures its transmissions to protect the indicated resources that can be protected and sends, to the at least one further RAN node, an indication that the indicated resources can be partially protected and information identifying the indicated resources that can be protected.

Supplementary Note 27

A method as claimed in any one of Supplementary Notes 23 to 26 wherein when the first RAN node determines that the indicated resources cannot be protected from interference from the first RAN node, the first RAN node sends, to the at least one further RAN node, an indication that the indicated resources cannot be protected.

Supplementary Note 28

A radio access network (RAN) node comprising: a processor and a transceiver wherein the processor is configured: to control the transceiver to operate in accordance with next generation (5G/NR) standards; to identify resources, that the radio access network (RAN) node is to use for transmissions, for protection from interference from at least one further RAN node; and to control the transceiver to send, to the at least one further RAN node, information indicating the identified resources for protection from interference, wherein the information indicating the identified resources comprises a list of parameters based on which the at least one further RAN node is able to determine the resources for protection from interference.

Supplementary Note 29

A radio access network (RAN) node comprising: a processor and a transceiver wherein the processor is configured: to control the transceiver to receive, from at least one further RAN node information indicating resources for protection from interference from said RAN node at the at least one further RAN node, wherein the at least one further RAN node is configured to operate in accordance with next generation (5G/NR) standards, and wherein the information indicating the identified resources comprises a list of parameters based on which said RAN node is able to determine the resources for protection from interference; and to determine whether the indicated resources can be protected from interference from said RAN node; wherein when the processor determines that the indicated resources can be protected from interference from the first RAN node, the processor is configured to control transmissions from said transceiver to protect the indicated resources and to control the transceiver to send, to the at least one further RAN node, an indication that that the indicated resources can be protected.

The invention claimed is:

1. A method, performed by a first radio access network (RAN) node according to a first Radio Access Technology (RAT), for coordination of resources between the first RAN node and a second RAN node according to the first RAT or a second RAT, the method comprising:
   sending, to the second RAN node, a message including a first information element for use in resource coordination between the first RAN node and the second RAN node,
   wherein the first information element includes a second information element that indicates resources intended to be used for transmission by the first RAN node, a cell identifier of the first RAN node, a cell identifier of the second RAN node, and a third information element for indicating whether the resource coordination is required.

2. A method, performed by a second radio access network (RAN) node according to a second Radio Access Technology (RAT) and a first RAT, for coordination of resources between the second RAN node and a first RAN node according to the first RAT, the method comprising:
   receiving, from the first RAN node, a message including a first information element for use in resource coordination between the second RAN node and the first RAN node,
   wherein the first information element includes a second information element that indicates resources intended to be used for transmission by the first RAN node, a cell identifier of the first RAN node, a cell identifier of the second RAN node, and a third information element for indicating whether the resource coordination is required.

3. A first radio access network (RAN) node according to a first Radio Access Technology (RAT), the first RAN comprising:
- a memory storing instructions; and
- a processor configured to process the instructions to:
  - send, as part of a procedure for coordination of resources between the first RAN node and a second RAN node according to the first RAT or a second RAT, a message including a first information element for use in resource coordination between the first RAN node and the second RAN node,
  - wherein the first information element includes a second information element that indicates resources intended to be used for transmission by the first RAN node, a cell identifier of the first RAN node, a cell identifier of the second RAN node, and a third information element for indicating whether the resource coordination is required.

4. A second radio access network (RAN) node according to a second Radio Access Technology (RAT) or a first RAT, the second RAN node comprising:
- a memory storing instructions; and
- a processor configured to process the instructions to:
  - receive, as part of a procedure for coordination of resources between the second RAN node and a first RAN node according to the first RAT, a message including a first information element for use in resource coordination between the second RAN node and the first RAN node,
  - wherein the first information element includes a second information element that indicates resources intended to be used for transmission by the first RAN node, a cell identifier of the first RAN node, a cell identifier of the second RAN node, and a third information element for indicating whether the resource coordination is required.

* * * * *